US012790460B2

(12) United States Patent
Yoon et al.

(10) Patent No.: US 12,790,460 B2
(45) Date of Patent: Nov. 10, 2026

(54) PHOTOSENSITIVE RESIN COMPOSITION AND DISPLAY DEVICE COMPRISING THE SAME

(71) Applicant: Samsung Display Co., LTD., Yongin-si (KR)

(72) Inventors: Hyung Guen Yoon, Hwaseong-si (KR); Suk Hoon Kang, Seoul (KR); Hyung Jun Yu, Asan-si (KR); Sun Young Chang, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 1029 days.

(21) Appl. No.: 17/961,010

(22) Filed: Oct. 6, 2022

(65) Prior Publication Data

US 2023/0257550 A1 Aug. 17, 2023

(30) Foreign Application Priority Data

Feb. 16, 2022 (KR) ........................ 10-2022-0020284

(51) Int. Cl.
*C08K 5/11* (2006.01)
*C08F 2/50* (2006.01)
*C08F 20/06* (2006.01)

(52) U.S. Cl.
CPC .................. *C08K 5/11* (2013.01); *C08F 2/50* (2013.01); *C08F 20/06* (2013.01)

(58) Field of Classification Search
CPC ............... C08K 5/11; C08F 2/50; C08F 20/06
See application file for complete search history.

(56) References Cited

U.S. PATENT DOCUMENTS

| | | | | |
|---|---|---|---|---|
| 9,575,228 | B2 | 2/2017 | Kim et al. | |
| 12,457,829 | B2 | 10/2025 | Kim et al. | |
| 2011/0311826 | A1* | 12/2011 | Qiu | C08F 220/24 524/544 |
| 2014/0353557 | A1* | 12/2014 | Yu | G02B 5/003 252/586 |

FOREIGN PATENT DOCUMENTS

| | | |
|---|---|---|
| JP | 2020101690 A | 7/2020 |
| KR | 10-1421738 | 7/2014 |
| KR | 10-2015-0110366 | 10/2015 |
| KR | 10-2236734 | 4/2021 |
| KR | 20220014470 A | 2/2022 |

* cited by examiner

*Primary Examiner* — Robert S Jones, Jr.
*Assistant Examiner* — Elizabeth Amato
(74) *Attorney, Agent, or Firm* — CANTOR COLBURN LLP

(57) ABSTRACT

A photosensitive resin composition and a display device including the same are provided. The photosensitive resin composition includes a binder, a photopolymerizable monomer, a photopolymerization initiator, a solvent, and a liquid-repellent agent including a compound represented by Chemical Formula 1:

[Chemical Formula 1]

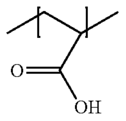

11 Claims, 9 Drawing Sheets

PHOTOSENSITIVE RESIN COMPOSITION AND DISPLAY DEVICE COMPRISING THE SAME

CROSS REFERENCE TO RELATED APPLICATION(S)

This application claims priority to and benefits of Korean Patent Application No. 10-2022-0020284 under 35 U.S.C. § 119, filed on Feb. 16, 2022, in the Korean Intellectual Property Office, the entire contents of which are incorporated herein by reference.

BACKGROUND

1. Technical Field

The disclosure relates to a photosensitive resin composition and a display device comprising the same.

2. Description of the Related Art

Display devices become increasingly important as multimedia technology evolves. Accordingly, a variety of types of display devices such as organic light-emitting display (OLED) devices and liquid-crystal display (LCD) devices are currently used.

As a display device for displaying images, there is a self-luminous display device including light-emitting elements. Examples of such a self-luminous display device may include an organic light-emitting display device using an organic material as the light-emitting material for the light-emitting elements, or an inorganic light-emitting display device using an inorganic material as the light-emitting material for the light-emitting elements.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Aspects of the disclosure provide a photosensitive resin composition that can prevent deterioration of the spreadability of an ink due to uncured reactants of an upper bank layer, and a display device including the same.

It should be noted that aspects of the disclosure are not limited to the above-mentioned object; and other aspects of the disclosure will be apparent to those skilled in the art from the following descriptions.

According to an embodiment of the disclosure, a photosensitive resin composition may include a binder, a photopolymerizable monomer, a photopolymerization initiator, a solvent, and a liquid-repellent agent which may include a compound represented by Chemical Formula 1:

[Chemical Formula 1]

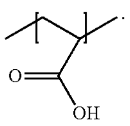

In an embodiment, the liquid-repellent agent may further include: a compound represented by Chemical Formula 2 or Chemical Formula 3; and a compound represented by Chemical Formula 4:

[Chemical Formula 2]

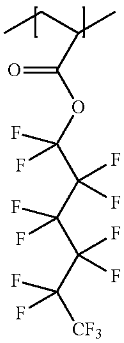

[Chemical Formula 3]

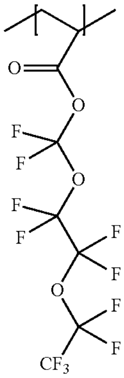

[Chemical Formula 4]

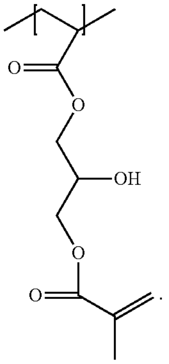

In an embodiment, a content of the liquid-repellent agent may be in a range of about 0.1 to about 3 parts by weight per 100 parts by weight of a total solid content of the photosensitive resin composition.

In an embodiment, an acid value of the liquid-repellent agent may be in a range of about 20 to about 60 mgKOH/g.

In an embodiment, a weight-average molecular weight of the liquid-repellent agent may be in a range of about 30,000 to about 90,000.

In an embodiment, a ratio of a weight-average molecular weight of the liquid-repellant agent to an acid value of the liquid-repellent agent may be in a range of about 1,000 to about 1,500.

In an embodiment, an amount of the compound represented by Chemical Formula 2 or Chemical Formula 3 in the liquid-repellent agent may be equal to or greater than about 50% of a total amount of the liquid-repellent agent.

In an embodiment, the photopolymerizable monomer may include ethylene glycol di(meth)acrylate, diethylene glycol di(meth)acrylate, triethylene glycol di(meth)acrylate, propylene glycol di(meth)acrylate, neopentyl glycol di(meth) acrylate, 1,4-butanediol di(meth)acrylate, 1,6-hexanediol di(meth)acrylate, bisphenol A di(meth)acrylate, pentaerythritol di(meth)acrylate, pentaerythritol tri(meth)acrylate, pentaerythritol tetra(meth)acrylate, pentaerythritol hexa(meth) acrylate, dipentaerythritol di(meth)acrylate, dipentaerythritol tri(meth)acrylate, dipentaerythritol penta (meth)acrylate acrylate, dipentaerythritol hexa(meth)acrylate, bisphenol A epoxy (meth)acrylate, ethylene glycol monomethyl ether (meth)acrylate, trimethylol propane tri (meth)acrylate, tris (meth)acryloyloxyethyl Phosphate, novolac epoxy (meth)acrylate, or a combination thereof.

In an embodiment, the photopolymerization initiator may include an oxime-based compound, an acetophenone-based compound, a thioxanthone-based compound, a benzophenone-based compound, or a combination thereof.

In an embodiment, the binder may include an epoxy resin, an acrylic resin, or a combination thereof.

In an embodiment, the solvent may include ethylene glycol monoethyl ether, ethyl cellosolve acetate, 2-hydroxyethyl propionate, diethylene glycol monomethyl, propylene glycol monomethyl ether acetate, propylene glycol propyl ether acetate, or a combination thereof.

In an embodiment, the photosensitive resin composition may further include scattering particles, and the scattering particles may have a particle diameter in a range of about 150 to about 200 nm.

In an embodiment, a content of the scattering particles of the photosensitive resin composition may be in a range of about 6 to about 15 parts by weight per 100 parts by weight of a total solid content of the photosensitive resin composition.

According to an embodiment of the disclosure, a display device may include light-emitting elements disposed on a substrate, an insulating layer disposed on the light-emitting elements, and an upper bank layer disposed on the insulating layer and which may include an opening exposing the insulating layer, wherein a surface energy of the upper bank layer may be in a range of about 13 to about 25 dyne/cm, and a surface energy of the insulating layer exposed by the opening may be in a range of about 40 to about 70 dyne/cm.

In an embodiment, the surface energy of the upper bank layer may be in a range of about 14 to about 17 dyne/cm, and the surface energy of the insulating layer exposed by the opening may be in a range of about 50 to about 60 dyne/cm.

In an embodiment, the display device may further include a color control layer disposed on the insulating layer and disposed within the opening, wherein the color control layer may contact a surface of the insulating layer.

In an embodiment, the display device may further include at least one capping layer disposed on the color control layer and covering the color control layer and the upper bank layer.

In an embodiment, the display device may further include a color filter layer disposed on the at least one capping layer.

In an embodiment, the display device may further include a first electrode and a second electrode disposed under the light-emitting elements and spaced apart from each other, a first connection electrode electrically connected to an end of each of the light-emitting elements, and a second connection electrode electrically connected to an opposite end of each of the light-emitting elements.

In an embodiment, each of the light-emitting elements may include a first semiconductor layer, a second semiconductor layer, and an emissive layer disposed between the first semiconductor layer and the second semiconductor layer.

According to the embodiments of the disclosure, a liquid-repellent agent may include a compound represented by Chemical Formula 1 which may be mixed into an upper bank layer in a display device, so that it may be possible to prevent uncured residues of the upper bank layer from being effused onto an insulating layer to make the insulating layer hydrophobic. In this manner, it may be possible to improve the spreadability of the ink applied onto the surface of the insulating layer partitioned by the upper bank layer.

It is to be understood that the embodiments above are described in a generic and explanatory sense only and not for the purpose of limitation, and the disclosure is not limited to the embodiments described above.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
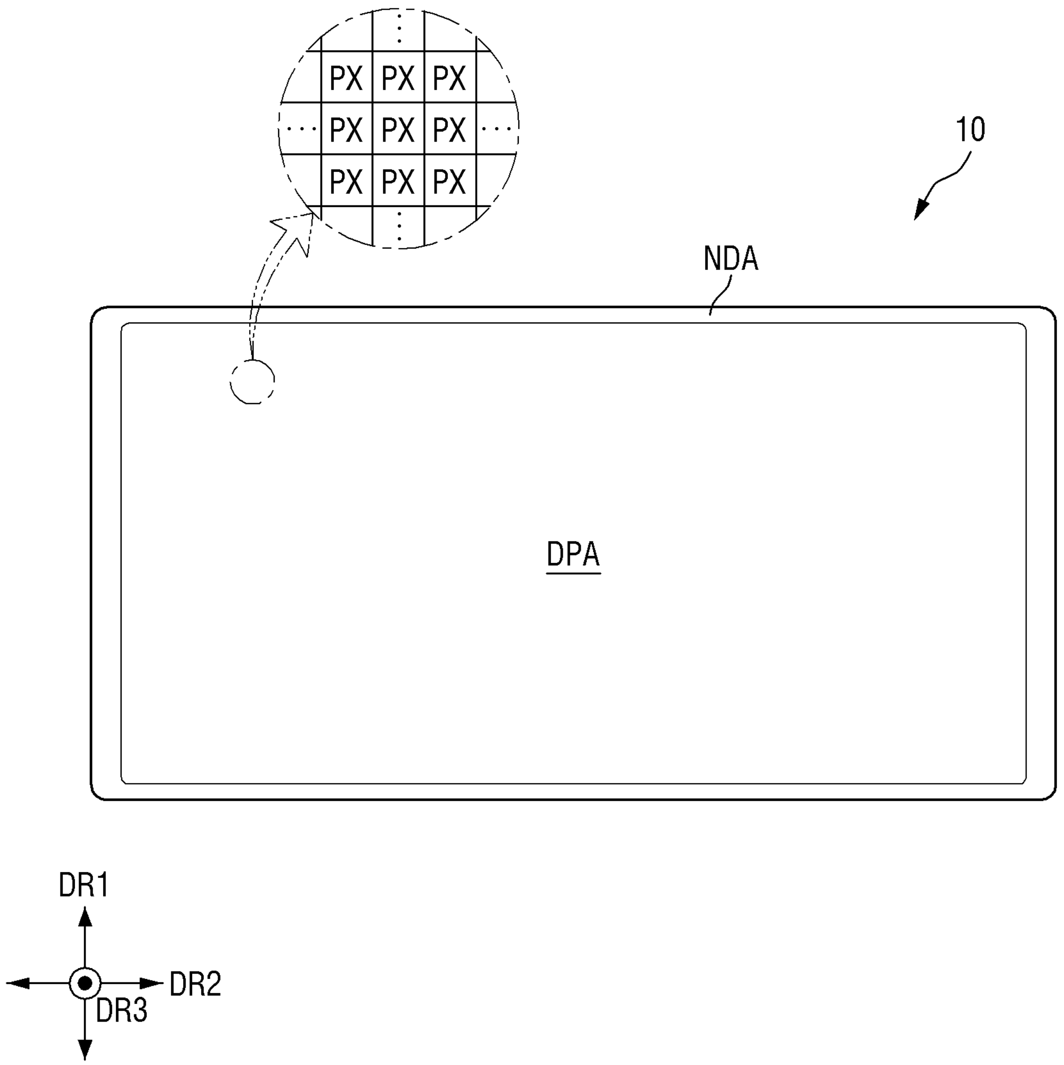
FIG. 1 is a schematic plan view of a display device according to an embodiment of the disclosure.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In the drawings, the sizes, thicknesses, ratios, and dimensions of the elements may be exaggerated for ease of description and for clarity. Like numbers refer to like elements throughout.

In the description, it will be understood that when an element (or region, layer, part, etc.) is referred to as being "on", "connected to", or "coupled to" another element, it can be directly on, connected to, or coupled to the other element, or one or more intervening elements may be present therebetween. In a similar sense, when an element (or region, layer, part, etc.) is described as "covering" another element, it can directly cover the other element, or one or more intervening elements may be present therebetween.

In the description, when an element is "directly on," "directly connected to," or "directly coupled to" another element, there are no intervening elements present. For example, "directly on" may mean that two layers or two elements are disposed without an additional element such as an adhesion element therebetween.

It will be understood that the terms "connected to" or "coupled to" may include a physical or electrical connection or coupling.

As used herein, the expressions used in the singular such as "a," "an," and "the," are intended to include the plural forms as well, unless the context clearly indicates otherwise.

As used herein, the term "and/or" includes any and all combinations of one or more of the associated listed items. For example, "A and/or B" may be understood to mean "A, B, or A and B." The terms "and" and "or" may be used in the conjunctive or disjunctive sense and may be understood to be equivalent to "and/or".

In the specification and the claims, the term "at least one of" is intended to include the meaning of "at least one selected from the group of" for the purpose of its meaning and interpretation. For example, "at least one of A and B" may be understood to mean "A, B, or A and B." When preceding a list of elements, the term, "at least one of," modifies the entire list of elements and does not modify the individual elements of the list.

It will be understood that, although the terms first, second, etc. may be used herein to describe various elements, these elements should not be limited by these terms. These terms are only used to distinguish one element from another element. Thus, a first element could be termed a second element without departing from the teachings of the disclosure. Similarly, a second element could be termed a first element, without departing from the scope of the disclosure.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

The terms "about" or "approximately" as used herein is inclusive of the stated value and means within an acceptable range of deviation for the recited value as determined by one of ordinary skill in the art, considering the measurement in question and the error associated with measurement of the recited quantity (i.e., the limitations of the measurement system). For example, "about" may mean within one or more standard deviations, or within ±20%, ±10%, or ±5% of the stated value.

It should be understood that the terms "comprises," "comprising," "includes," "including," "have," "having," "contains," "containing," and the like are intended to specify the presence of stated features, integers, steps, operations, elements, components, or combinations thereof in the disclosure, but do not preclude the presence or addition of one or more other features, integers, steps, operations, elements, components, or combinations thereof.

Each of the features of the various embodiments of the disclosure may be combined or combined with each other, in part or in whole, and technically various interlocking and driving are possible. Each embodiment may be implemented independently of each other or may be implemented together in an association.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification Hereinafter, embodiments of the disclosure will be described with reference to the accompanying drawings.

FIG. 1 is a schematic plan view of a display device according to an embodiment of the disclosure.

Referring to FIG. 1, the display device 10 displays a moving image or a still image. A display device 10 may refer to any electronic device that provides a display screen. For example, the display device 10 may include a television set, a laptop computer, a monitor, an electronic billboard, the Internet of Things devices, a mobile phone, a smart phone, a tablet personal computer (PC), an electronic watch, a smart watch, a watch phone, a head-mounted display device, a mobile communications terminal, an electronic notebook, an electronic book, a portable multimedia player (PMP), a navigation device, a game console and a digital camera, a camcorder, etc.

The display device 10 includes a display panel for providing a display screen. Examples of the display panel may include an inorganic light-emitting diode display panel, an organic light-emitting display panel, a quantum-dot light-emitting display panel, a plasma display panel, a field emission display panel, etc. In the following description, an inorganic light-emitting diode display panel may be employed as an example of the display panel 10, but the disclosure is not limited thereto. Any other display panel may be employed as long as the technical idea of the disclosure can be equally applied.

The shape of the display device 10 may be modified in a variety of ways. For example, the display device 10 may have shapes such as a rectangle with longer lateral sides, a rectangle with longer vertical sides, a square, a quadrangle with rounded corners (vertices), other polygons, a circle, etc. The shape of a display area DPA of the display device 10 may also be similar to the overall shape of the display device 10. In the example shown in FIG. 1, the display device 10 has a rectangular shape with the longer sides in a second direction DR2.

The display device 10 may include a display area DPA and a non-display area NDA. In the display area DPA, images can be displayed. In the non-display area NDA, images may not be displayed. The display area DPA may be referred to as an active area, while the non-display area NDA may also be referred to as an inactive area. The display area DPA may generally occupy the majority of the center of the display device 10.

The display area DPA may include pixels PX. The pixels PX may be arranged in a matrix. The shape of each pixel PX may be, but is not limited to, a rectangle or a square when viewed from the top. Each pixel may have a diamond shape having sides inclined with respect to a direction. The pixels PX may be arranged in stripes or in a pattern of islands. Each of the pixels PX may include at least one light-emitting element that emits light of a particular wavelength band to represent a color.

The non-display area NDA may be disposed around the display area DPA. The non-display area NDA may surround the display area DPA entirely or partially. The display area DPA may have a rectangular shape, and the non-display area NDA may be disposed to be adjacent to the four sides of the display area DPA. The non-display area NDA may form the bezel of the display device 10. Lines or circuit drivers included in the display device 10 may be disposed in each of the non-display area NDA, or external devices may be mounted.

Figure 2:
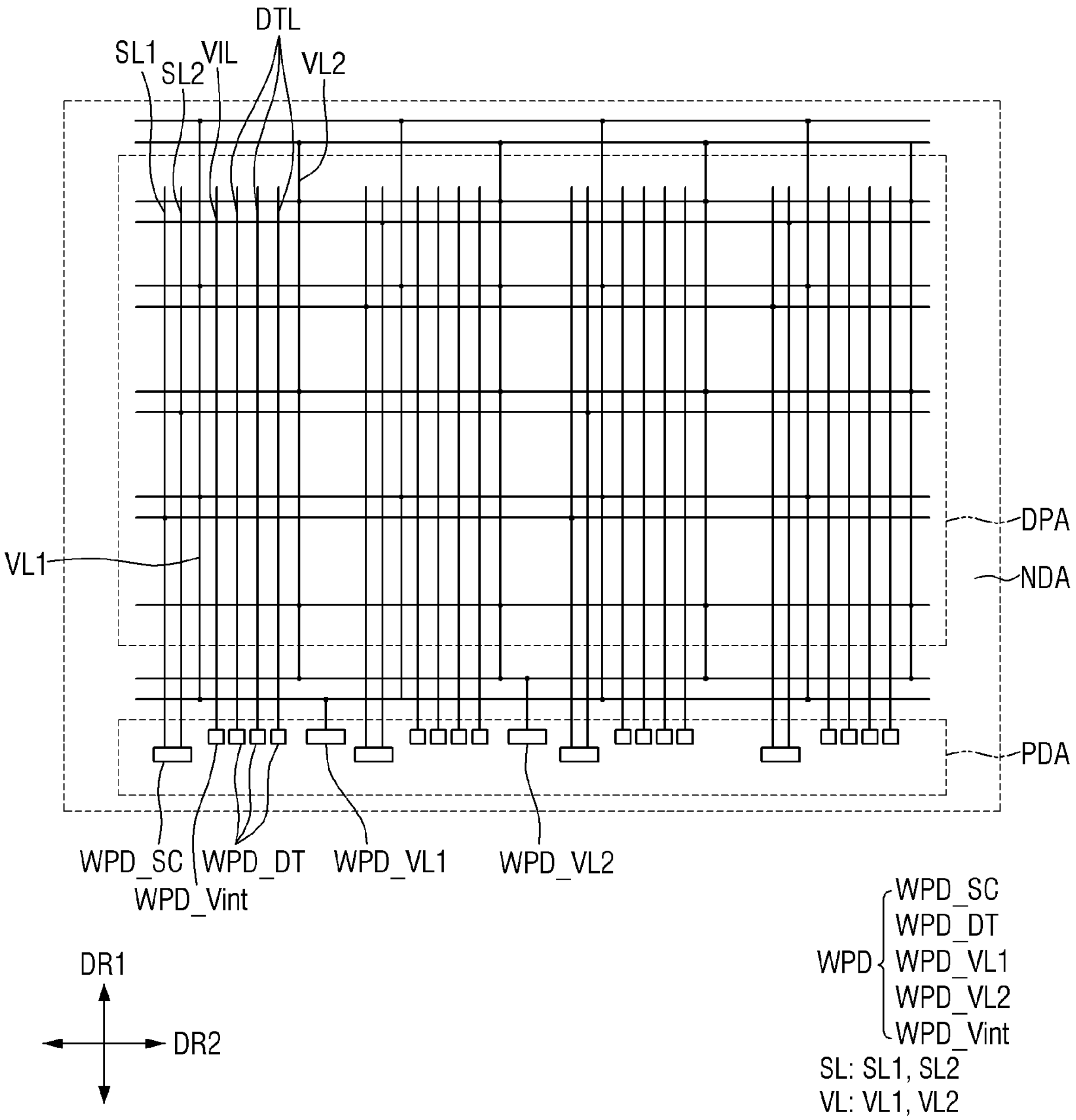
FIG. 2 is a layout diagram schematically showing lines included in a display device according to an embodiment of the disclosure.

FIG. 2 is a layout diagram schematically showing lines included in a display device according to an embodiment of the disclosure.

Referring to FIG. 2, the display device 10 may include lines. The lines may include a plurality of scan lines SL: SL1 and SL2, data lines DTL, an initialization voltage line VIL, and voltage lines VL: VL1 and VL2. Although not shown in the drawings, other lines may be further disposed in the display device 10.

The scan lines SL may be extended in the first direction DR1. The scan lines SL may be spaced apart from one another, and may include pairs of a first scan line SL1 and a second scan line SL2. The scan lines SL may be connected to a scan wire pad WPD_SC connected to a scan driver (not shown). The scan lines SL may be extended from a pad area PDA located in the non-display area NDA to the display area DPA.

The data lines DTL may be extended in the first direction DR1. The data lines DTL may include units of three data lines DTL adjacent to one another. The data lines DTL may be extended from the pad area PDA located in the non-display area NDA to the display area DPA.

The initialization voltage line VIL may also be extended in the first direction DR1. The initialization voltage line VIL may be disposed between the data lines DTL and the scan line SL. The initialization voltage line VIL may be extended from the pad area PDA located in the non-display area NDA to the display area DPA.

A first voltage line VL1 and a second voltage line VL2 may include portions extended in the first direction DR1 and portions extended in the second direction DR2. The portions of the first voltage line VL1 and the second voltage line VL2 which may be extended in the first direction DR1 may traverse the display area DPA. The portions of the voltage line VL1 and the second voltage line VL2 which may be extended in the second direction DR2 may be disposed in the display area DPA and may be partially disposed in the non-display area NDA located on both sides of the display area DPA in the first direction DR1. The first voltage line VL1 and the second voltage line VL2 may have a mesh structure on the entire display area DPA. The scan lines SL, the data lines DTL, the initialization voltage line VIL, the first voltage line VL1 and the second voltage line VL2 may be electrically connected to at least one wire pad WPD. The wire pads WPD may be disposed in the non-display areas NDA. The wire pads WPD may be disposed in the pad area PDA located on the lower side of the display area DPA that may be the opposite side in the first direction DR1, but the disclosure is not limited thereto. The position of the pad area PDA may vary depending on the size and the specifications of the display device 10. The scan lines SL may be connected to the scan wire pad WPD_SC disposed in the pad area PDA, and the data lines DTL may be connected to different data wire pads WPD_DT, respectively. The initialization voltage line VIL may be connected to the initialization wiring pad WPD_Vint, the first voltage line VL1 may be connected to a first voltage wire pad WPD_VL1, and the second voltage line VL2 may be connected to the second voltage wire pad WPD_VL2. External devices may be mounted on the wire pads WPD. External devices may be mounted on the wire pads WPD by an anisotropic conductive film, ultrasonic bonding, etc. Although the wire pads WPD may be disposed in the pad area PDA located on the lower side of the display area DPA in the drawings, the disclosure is not limited thereto. Some of the wire pads WPD may be disposed on the upper side or on one of the left and right sides of the display area DPA.

Each of the pixels PX or sub-pixels PXn of the display device 10 includes a pixel driver circuit, where n may be an integer of 1 to 3. The above-described lines may pass through each of the pixels PX or the periphery thereof to apply a driving signal to the pixel driver circuit. The pixel driver circuit may include a transistor and a capacitor. The numbers of transistors and capacitors of each pixel driver circuit may be changed in a variety of ways. According to an embodiment of the disclosure, each of the sub-pixels PXn of the display device 10 may have a 3T1C structure, i.e., a pixel driver circuit may include three transistors and one capacitor. In the following description, the pixel driver circuit having the 3T1C structure will be described as an example. It is, however, to be understood that the disclosure is not limited thereto. A variety of modified pixel structure may be employed such as a 2T1C structure, a 7T1C structure and a 6T1C structure.

Figure 3:
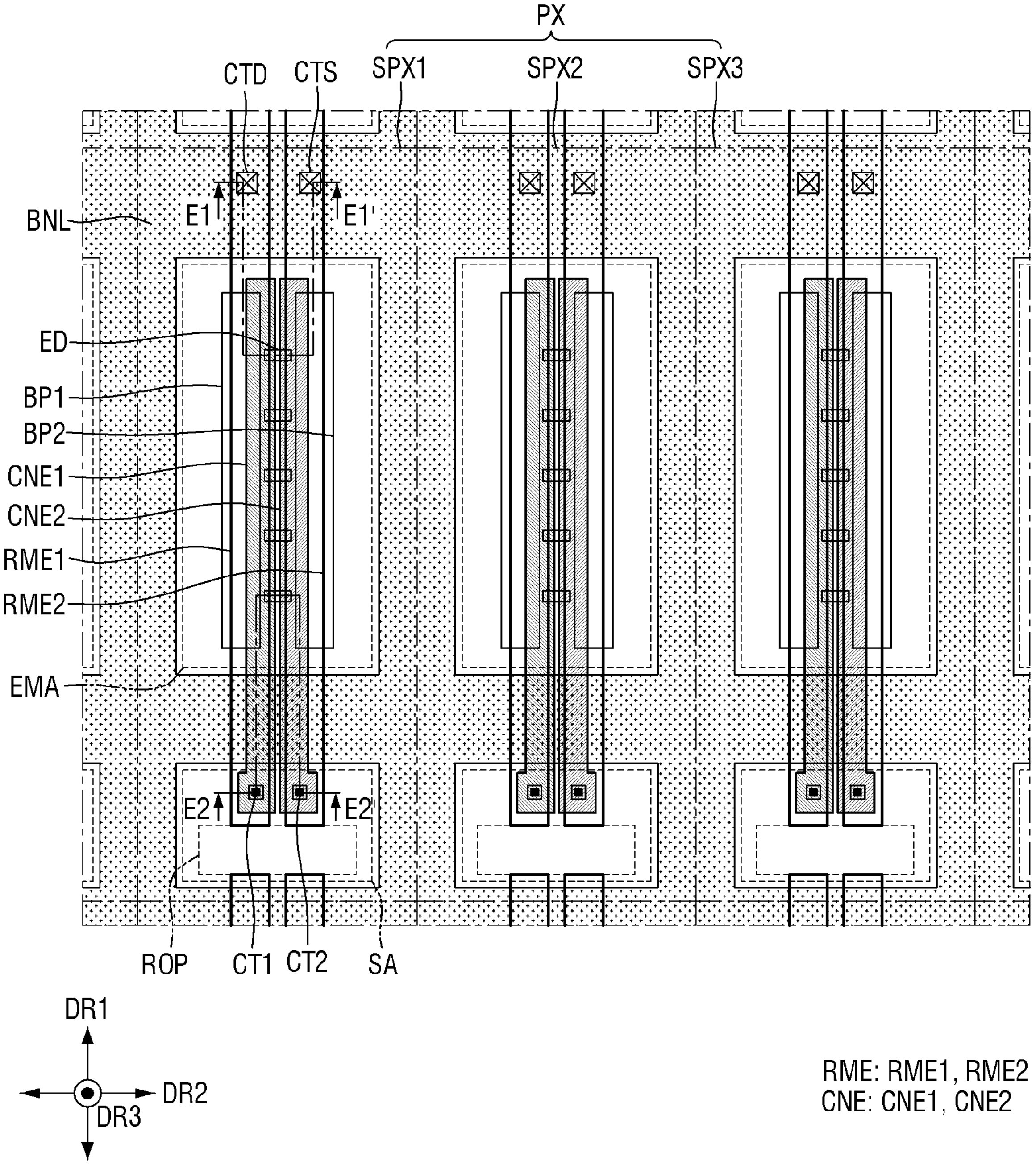
FIG. 3 is a schematic plan view showing a pixel of a display device according to an embodiment of the disclosure.

FIG. 3 is a schematic plan view showing a pixel of a display device according to an embodiment of the disclosure. FIG. 3 shows a layout of electrodes RME: RME1 and RME2, bank patterns BP1 and BP2, a bank layer BNL, light-emitting elements ED: ED1 and ED2, and connection electrodes CNE: CNE1 and CNE2 when viewed from the top.

Referring to FIG. 3, each of the pixels PX of the display device 10 may include sub-pixels SPXn. For example, a pixel PX may include a first sub-pixel SPX1, a second sub-pixel SPX2 and a third sub-pixel SPX3. The first sub-pixel SPX1 may emit light of a first color, the second sub-pixel SPX2 may emit light of a second color, and the third sub-pixel SPX3 may emit light of a third color. For example, the first color may be red, the second color may be green, and the third color may be blue. It is, however, to be understood that the disclosure is not limited thereto. All the sub-pixels SPXn may emit light of the same color. According to an embodiment of the disclosure, the sub-pixels SPXn may emit blue light. Although the single pixel PX includes three sub-pixels SPXn in the example shown in the drawings, the disclosure is not limited thereto. The pixel PX may include more than three sub-pixels SPXn.

Each of the sub-pixels SPXn of the display device 10 may include an emission area EMA and a non-emission area. In the emission area EMA, where light-emitting elements ED may be disposed to emit light of a particular wavelength band. In the non-emission area, the light-emitting elements ED may not be disposed and the lights emitted from the light-emitting elements ED do not reach, and thus no light exits therefrom.

The emission area EMA may include an area in which the light-emitting elements ED may be disposed, and may include an area adjacent to the light-emitting elements ED where lights emitted from the light-emitting elements ED exit. For example, the emission area EMA may also include an area in which lights emitted from the light-emitting elements ED may be reflected or refracted by other elements to exit. The light-emitting elements ED may be disposed in each of the sub-pixels SPXn, and the emission area may include the area where the light-emitting elements may be disposed and the adjacent area.

Although the emission areas EMA of the sub-pixels SPXn have the uniform area in the example shown in the drawings, the disclosure is not limited thereto. In some embodiments, the emission areas EMA of the sub-pixels SPXn may have different areas depending on a color or wavelength band of light emitted from the light-emitting elements ED disposed in the respective sub-pixels.

Each of the sub-pixels SPXn may further include a subsidiary area SA disposed in the non-emission area. The subsidiary area SA of each sub-pixel SPXn may be disposed on the lower side of the emission area EMA that may be the opposite side in the first direction DR1. The emission areas EMA and the subsidiary areas SA may be arranged alternately in the first direction DR1, and each subsidiary area SA may be disposed between the emission areas EMA of different sub-pixels SPXn spaced apart from each other in the first direction DR1. For example, the emission areas EMA and the subsidiary areas SA may be alternately arranged in the first direction DR1, and the emission areas EMA and the subsidiary areas SA may be repeatedly arranged in the second direction DR2. It is, however, to be understood that the disclosure is not limited thereto. The emission areas EMA and the subsidiary areas SA of the pixels PX may have a layout different from that of FIG. 3.

No light-emitting diode ED may be disposed in the subsidiary areas SA and thus no light exits therefrom. The electrodes RME disposed in the sub-pixels SPXn may be partially disposed in the subsidiary areas SA. The electrodes RME disposed in different sub-pixels SPXn may be disposed separately from one another at separation regions ROP of the subsidiary areas SA.

The display device 10 may include electrodes RME: RME1 and RME2, bank patterns BP1 and BP2, a bank layer BNL, light-emitting elements ED, and connection electrodes CNE: CNE1 and CNE2.

The bank patterns BP1 and BP2 may be disposed in the emission area EMA of each sub-pixel SPX. Each of the bank patterns BP1 and BP2 may have a shape that has a constant width in the second direction DR2 and may be extended in the first direction DR1.

For example, the bank patterns BP1 and BP2 may include a first bank pattern BP1 and a second bank pattern BP2 spaced apart from each other in the second direction DR2 in the emission area EMA of each sub-pixel SPXn. The first bank pattern BP1 may be disposed on the left side of the center of the emission area EMA that may be one side in the second direction DR2, and the second bank pattern BP2 may be spaced apart from the first bank pattern BP1 and may be disposed on the right side of the center of the emission area EMA that may be the opposite side in the second direction DR2. The first bank pattern BP1 and the second bank pattern BP2 may be alternately arranged along the second direction DR2 and may be disposed in an island-like pattern in the display area DPA. The light-emitting elements ED may be disposed between the first bank pattern BP1 and the second bank pattern BP2.

The length of the first bank pattern BP1 may be equal to the length of the second bank pattern BP2 in the first direction DR1. The lengths of the first bank pattern BP1 and the second bank pattern BP2 may be smaller than the length of the emission area EMA surrounded by the bank layer BNL in the first direction DR1. The first bank pattern BP1 and the second bank pattern BP2 may be spaced apart from a portion of the bank layer BNL that may be extended in the second direction DR2. It should be understood, however, that the disclosure is not limited thereto. The bank patterns BP1 and BP2 may be integrated with the bank layer BNL or may partially overlap a portion of the bank layer BNL that may be extended in the second direction DR2. In this instance, the lengths of the bank patterns BP1 and BP2 in the first direction DR1 may be equal to or greater than the length of the emission area EMA surrounded by the bank layer BNL in the first direction DR1.

The first bank pattern BP1 and the second bank pattern BP2 may have the same width in the second direction DR2. It should be understood, however, that the disclosure is not limited thereto. They may have different widths. For example, one of the bank patterns may have a greater width than the other one, and the larger bank pattern may be disposed across the emission areas EMA of different sub-pixels SPXn adjacent to each other in the second direction DR2. In this instance, in case that the bank patterns are disposed across the emission areas EMA, portions of the bank layer BNL extended in the first direction DR1 may overlap the second bank pattern BP2 in the thickness direction. Although two bank patterns BP1 and BP2 may be disposed in each sub-pixel SPXn and may have to have the same width in the example shown in the drawings, the disclosure is not limited thereto. The number and shape of the bank patterns BP1 and BP2 may vary depending on the number or arrangement structure of the electrodes RME.

The electrodes RME: RME1 and RME2 may have a shape extended in one direction and may be disposed in each of the sub-pixels SPXn. The electrodes RME1 and RME2 may be extended in the first direction DR1 to be disposed in the emission area EMA and the subsidiary area SA of the sub-pixel SPXn, and they may be spaced apart from one another in the second direction DR2. The electrodes RME may be electrically connected to the light-emitting elements ED, which will be described later. It should be understood, however, that the disclosure is not limited thereto. The electrodes RME may not be electrically connected to the light-emitting elements ED.

The display device 10 may include a first electrode RME1 and a second electrode RME2 disposed in each of the sub-pixels SPXn. The first electrode RME1 may be disposed on the left side of the center of the emission area EMA, and the second electrode RME2 may be spaced apart from the first electrode RME1 in the second direction DR2 and may be disposed on the right side of the center of the emission area EMA. The first electrode RME1 may be disposed on the first bank pattern BP1, and the second electrode RME2 may be disposed on the second bank pattern BP2. The first electrode RME1 and the second electrode RME2 may be extended beyond the bank layer BNL and may be partially disposed in the sub-pixel SPXn and the subsidiary area SA. The first electrode RME1 and the second electrode RME2 of a sub-pixel SPXn may be spaced apart from those of another sub-pixel SPXn at the separation region ROP located in the subsidiary area SA of one of the sub-pixels SPXn.

Although two electrodes RME may be disposed in each sub-pixel SPXn and may have a shape extended in the first direction DR1 in the drawings, the disclosure is not limited thereto. For example, more than two electrodes RME may be disposed in a single sub-pixel SPXn of the display device 10, or the electrodes RME may be partially bent and may have varying widths in a direction.

The bank layer BNL may be disposed to surround the sub-pixels SPXn, the emission area EMA and the subsidiary area SA. The bank layer BNL may be disposed at the boundary between the sub-pixels SPXn adjacent to each other in the first direction DR1 and the second direction DR2, and may also be disposed at the boundary between the emission area EMA and the subsidiary area SA. The sub-pixels SPXn, the emission areas EMA and the subsidiary areas SA of the display device 10 may be distinguished from one another by the bank layer BNL. The distance between the sub-pixels SPXn, the emission areas EMA and the subsidiary areas SA may vary depending on the width of the bank layer BNL.

The bank layer BNL may be disposed in a lattice pattern on the front surface of the display area DPA including portions extended in the first direction DR1 and the second direction DR2 when viewed from the top. The bank layer BNL may be disposed along the border of each of the sub-pixels PXn to distinguish between adjacent sub-pixels PXn. The bank layer BNL may be disposed to surround the emission area EMA and the subsidiary area SA disposed in each of the sub-pixels SPXn to distinguish between them.

The light-emitting elements ED may be disposed in the emission area EMA. The light-emitting elements ED may be disposed between the bank patterns BP1 and BP2 and may be spaced apart from one another in the first direction DR1. According to an embodiment of the disclosure, the light-emitting elements ED may have a shape extended in one direction, and the both ends to light-emitting elements ED may be disposed on different electrodes RME, respectively. The length of the light-emitting elements ED may be larger than the distance between the electrodes RME spaced apart from each other in the second direction DR2. The direction in which the light-emitting elements ED may be generally extended may be perpendicular to the first direction DR1 in which the electrodes RME may be extended. It is, however, to be understood that the disclosure is not limited thereto. The direction in which the light-emitting elements ED may be extended may face the second direction DR2 or a direction obliquely thereto.

The connection electrodes CNE: CNE1 and CNE2 may be disposed on the electrodes RME and the bank patterns BP1 and BP2. The connection electrodes CNE may each have a shape extended in one direction and may be spaced apart from one another. Each of the connection electrodes CNE may contact the light-emitting elements ED and may be electrically connected to the electrodes RME or a conductive layer thereunder.

The connection electrodes CNE may include a first connection electrode CNE1 and a second connection electrode CNE2 disposed in each sub-pixel SPXn. The first connection electrode CNE1 may have a shape extended in the first direction DR1 and may be disposed on the first electrode RME1 or the first bank pattern BP1. The first connection electrode CNE1 may partially overlap the first electrode RME1 and may be disposed from the emission area EMA to the subsidiary area SA beyond the bank layer BNL. The second connection electrode CNE2 may have a shape extended in the first direction DR1 and may be disposed on the second electrode RME2 or the second bank pattern BP2. The second connection electrode CNE2 may partially overlap the second electrode RME2 and may be disposed from the emission area EMA to the subsidiary area SA beyond the bank layer BNL.

Figure 4:
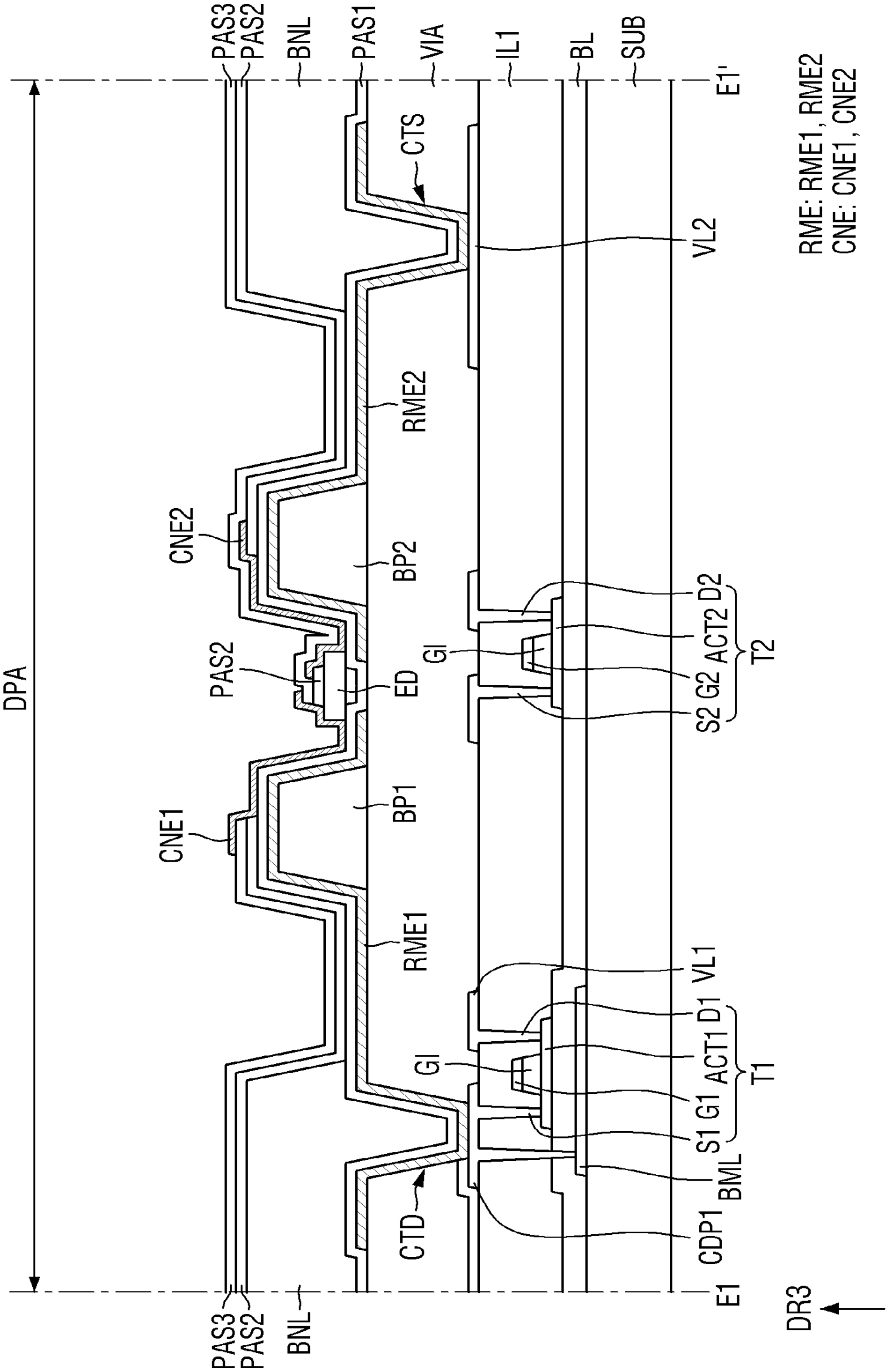
FIG. 4 is a schematic cross-sectional view taken along line E1-E1' of FIG. 3.
Figure 5:
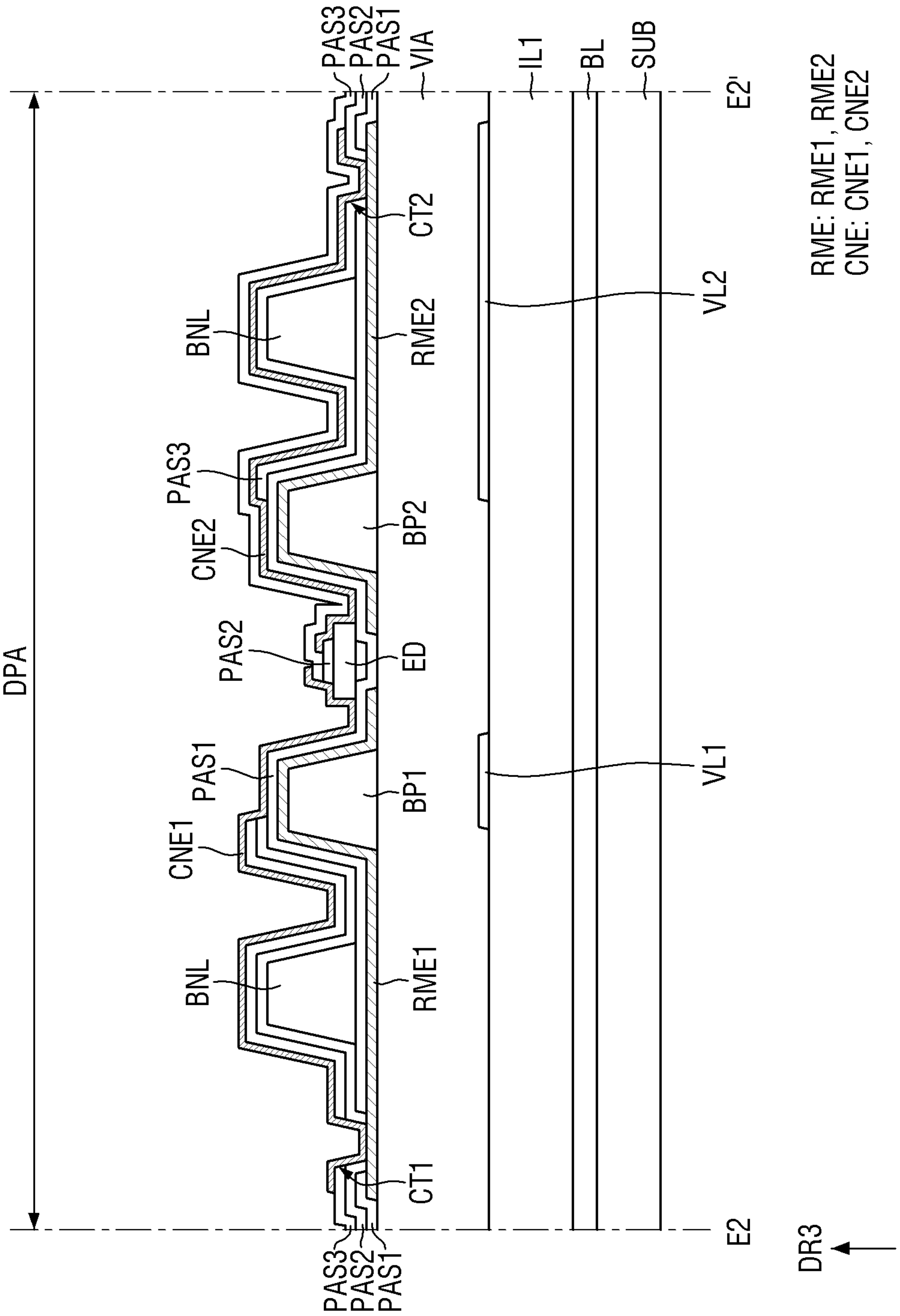
FIG. 5 is a schematic cross-sectional view taken along line E2-E2' of FIG. 3.

FIG. 4 is schematic a cross-sectional view taken along line E1-E1' of FIG. 3. FIG. 5 is a schematic cross-sectional view taken along line E2-E2' of FIG. 3.

FIG. 4 shows a schematic cross section passing through the both ends of the light-emitting elements ED disposed in the first sub-pixel SPX1 and electrode contact holes CTD and CTS; and FIG. 5 shows a schematic cross section passing through the both ends of the light-emitting elements ED disposed in the first sub-pixel SPXn and contacts CT1 and CT2.

Referring to FIGS. 3 to 5, the schematic cross-sectional structure of the display device 10 will be described. The display device 10 may include a first substrate SUB, and a semiconductor layer, conductive layers and insulating layers disposed on the first substrate SUB. The display device 10 may include electrodes RME: RME1 and RME2, light-emitting elements ED, and connection electrodes CNE: CNE1 and CNE2. The semiconductor layer, the conductive layers and the insulating layers may form a circuit layer CCL (see FIG. 7) of the display device 10.

The substrate SUB may be an insulating substrate. The substrate SUB may be made of an insulating material such as glass, quartz, and a polymer resin. The substrate SUB may be either a rigid substrate or a flexible substrate that can be bent, folded, or rolled. The substrate SUB may include the display area DPA and the non-display area NDA surrounding the display area DPA. The display area DPA may include the emission area EMA and the subsidiary area SA which may be a portion of the non-emission area.

A first conductive layer may be disposed on the substrate SUB. The first conductive layer may include a bottom metal layer BML. The bottom metal layer BML may be disposed to overlap an active layer ACT1 of a first transistor T1. The bottom metal layer BML may prevent light from being incident on the first active layer ACT1 of the first transistor or may be electrically connected to the first active layer ACT1 to stabilize the electrical characteristics of the first transistor T1. It is, however, to be noted that the bottom metal layer BML may be eliminated.

A buffer layer BL may be disposed on the bottom metal layer BML and the substrate SUB. The buffer layer BL may be formed on the substrate SUB to protect the transistors of the pixels PX from moisture permeating through the substrate SUB that may be susceptible to moisture permeation, and may also provide a flat surface.

The semiconductor layer may be disposed on the buffer layer BL. The semiconductor layer may include the first active layer ACT1 of the first transistor T1 and the second active layer ACT2 of the second transistor T2. The first active layer ACT1 and the second active layer ACT2 may be disposed to partially overlap the first gate electrode G1 and the second gate electrode G2 of a second conductive layer, respectively, which will be described later.

The semiconductor layer may include polycrystalline silicon, monocrystalline silicon, an oxide semiconductor, etc. In other embodiments, the semiconductor layer may include polycrystalline silicon. The oxide semiconductor may be an oxide semiconductor containing indium (In). For example, the oxide semiconductor may be at least one of indium tin oxide (ITO), indium zinc oxide (IZO), indium gallium oxide (IGO), indium zinc tin oxide (IZTO), indium gallium tin oxide (IGTO), indium gallium zinc oxide (IGZO), indium-gallium zinc tin oxide (IGZTO), etc.

Although the first transistor T1 and the second transistor T2 may be disposed in the sub-pixel SPXn of the display device 10 in the drawings, the disclosure is not limited thereto. A larger number of transistors may be included in the display device 10.

A first gate insulator GI may be disposed on the semiconductor layer in the display area DPA. The first gate insulator GI may work as a gate insulating film of the transistors T1 and T2. In the example shown in the drawings, the first gate insulator GI may be patterned together with the gate electrodes G1 and G2 of the second conductive layer to be described later, and may be partially disposed between the second conductive layer and the active layers ACT1 and ACT2 of the semiconductor layer. It is, however, to be understood that the disclosure is not limited thereto. In some embodiments, the first gate insulator GI may be disposed entirely on the buffer layer BL.

The second conductive layer may be disposed on the first gate insulator GI. The second conductive layer may include a first gate electrode G1 of the first transistor T1, and a second gate electrode G2 of the second transistor T2. The first gate electrode G1 may overlap a channel region of the first active layer ACT1 in the third direction DR3, which may be the thickness direction. The second gate electrode G2 may overlap a channel region of the second active layer ACT2 in the third direction DR3, which may be the thickness direction.

A first interlayer dielectric layer IL1 may be disposed on the second conductive layer. The first interlayer dielectric layer IL1 may work as an insulating film between the second conductive layer and other layers disposed thereon and can protect the second conductive layer.

The third conductive layer may be disposed on the first interlayer dielectric layer IL1. The third conductive layer may include the first voltage line VL1 and the second voltage line VL2 disposed in the display area DPA, a first conductive pattern CDP1, and the source electrodes S1 and S2 and drain electrodes D1 and D2 of the transistors T1 and T2.

A high-level voltage (or a first supply voltage) may be applied to the first voltage line VL1 to be transmitted to the first electrode RME1, and a low-level voltage (or a second supply voltage) may be applied to the second voltage line VL2 to be transmitted to the second electrode RME2. A portion of the first voltage line VL1 may contact the first active layer ACT1 of the first transistor T1 through a contact hole penetrating the first interlayer dielectric layer IL1. The first voltage line VL1 may work as the first drain electrode D1 of the first transistor T1. The second voltage line VL2 may be directly connected to the second electrode RME2 to be described later.

The first conductive pattern CDP1 may contact the first active layer ACT1 of the first transistor T1 through a contact hole penetrating the first interlayer dielectric layer IL1. The first conductive pattern CDP1 may contact the bottom metal layer BML through another contact hole penetrating the first interlayer dielectric layer IL1 and the buffer layer BL. The first conductive pattern CD1 may work as a first source electrode S1 of the first transistor T1. The first conductive pattern CDP1 may be connected to a first electrode RME1 or a first connection electrode CNE1 to be described later. The first transistor T1 may transfer the first supply voltage applied from the first voltage line VL1 to the first electrode RME1 or the first connection electrode CNE1.

Each of the second source electrode S2 and the second drain electrode D2 may contact the second active layer ACT2 of the second transistor T2 through contact holes penetrating the first interlayer dielectric layer IL1.

The buffer layer BL, the first gate insulator GI and the first interlayer dielectric layer IL1 may be made up of multiple inorganic layers stacked on one another alternately. For example, the buffer layer BL, the first gate insulating layer GI and the first interlayer dielectric layer IL1 may be made up of a double layer in which inorganic layers including at least one of silicon oxide (SiOx), silicon nitride (SiNx) and silicon oxynitride (SiON) may be stacked on one another or multiple layers in which they may be alternately stacked on one another. It is, however, to be understood that the disclosure is not limited thereto. The buffer layer BL, the first gate insulating layer GI and the first interlayer dielectric layer IL1 may be made up of a single inorganic layer including the above-described insulating material. In some embodiments, the first interlayer dielectric layer IL1 may be made of an organic insulating material such as polyimide (PI).

A via layer VIA may be disposed on the third conductive layer in the display area DPA. The via layer VIA may include an organic insulating material, e.g., an organic insulating material such as polyimide (PI), to provide a flat surface over the underlying conductive layers which may have different heights. It should be noted that the via layer VIA may be eliminated in some implementations.

The display device 10 may include the bank patterns BP1 and BP2, the electrodes RME: RME1 and RME2, the bank layer BNL, the light-emitting elements ED, and the connection electrodes CNE: CNE1 and CNE2 as a display element layer disposed on the via layer VIA. The display device 10 may include insulating layers PAS1, PAS2, PAS3 and PAS4 disposed on the via layer VIA.

The bank patterns BP1 and BP2 may be disposed on the via layer VIA. For example, the bank patterns BP1 and BP2 may be disposed directly on the via layer VIA, and may have a structure that at least partly protrudes from the upper surface of the via layer VIA. The protruding portions of the bank patterns BP1 BP2 may have inclined side surfaces or bent side surfaces with a curvature. The lights emitted from the light-emitting elements ED may be reflected by the electrodes RME disposed on the bank patterns BP1 and BP2 so that the lights may exit toward the upper side of the via layer VIA. Unlike that shown in the drawings, the bank patterns BP1 and BP2 may have a shape with a bent outer surface with a curvature, e.g., a semi-circular or semi-elliptical shape in the schematic cross-sectional view. The bank patterns BP1 and BP2 may include, but are not limited to, an organic insulating material such as polyimide (PI).

The electrodes RME: RME1 and RME2 may be disposed on the bank patterns BP1 and BP2 and the via layer VIA. For example, the first electrode RME1 and the second electrode RME2 may be disposed on at least inclined side surfaces of the bank patterns BP1 and BP2. The width of the electrodes RME measured in the second direction DR2 may be smaller than the width of the bank patterns BP1 and BP2 measured in the second direction DR2. The distance between the first electrode RME1 and the second electrode RME2 spaced apart from each other in the second direction DR2 may be smaller than the distance between the bank patterns BP1 and BP2. At least a portion of the first electrode RME1 and the second electrode RME2 may be disposed directly on the via layer VIA, so that they may be disposed on the same plane.

The light-emitting elements ED disposed between the bank patterns BP1 and BP2 may emit lights through the both ends. The emitted lights may be directed to the electrodes RME disposed on the bank patterns BP1 and BP2. The portion of each of the electrodes RME that may be disposed on the bank patterns BP1 and BP2 may reflect lights emitted from the light-emitting elements ED. The first electrode RME1 and the second electrode RME2 may be disposed to cover at least one side surface of the bank patterns BP1 and BP2 to reflect lights emitted from the light-emitting elements ED.

Each of the electrodes RME may directly contact the third conductive layer through the electrode contact holes CTD and CTS where it overlaps the bank layer BNL between the emission area EMA and the subsidiary area SA. The first electrode contact hole CTD may be formed where the bank layer BNL and the first electrode RME1 overlap each other. The second electrode contact hole CTS may be formed where the bank layer BNL and the second electrode RME2 overlap each other. The first electrode RME1 may contact the first conductive pattern CDP1 through the first electrode contact hole CTD penetrating through the via layer VIA. The second electrode RME2 may contact the second voltage line VL2 through the second contact hole CTS penetrating through the via layer VIA. The first electrode RME1 may be electrically connected to the first transistor T1 through the first conductive pattern CDP1 to receive the first supply voltage. The second electrode RME2 may be electrically connected to the second voltage line VL2 to receive the second supply voltage. It is, however, to be understood that the disclosure is not limited thereto. According to another embodiment, each of the electrodes RME1 and RME2 may not be electrically connected to the voltage lines VL1 and VL2 of the third conductive layer and connection electrodes CNE to be described later may be directly connected to the third conductive layer.

Each of the electrodes RME may include a conductive material having a high reflectance. For example, the electrodes RME may include a metal such as silver (Ag), copper (Cu) and aluminum (Al), or may include an alloy including aluminum (Al), nickel (Ni), lanthanum (La), or the like, or a stack of a metal layer such as titanium (Ti), molybdenum (Mo) and niobium (Nb) and the alloy. In some embodiments, the electrodes RME may be made up of a double- or multi-layer in which an alloy containing aluminum (Al) and at least one metal layer made of titanium (Ti), molybdenum (Mo) and niobium (Nb) may be stacked on one another.

It is, however, to be understood that the disclosure is not limited thereto. The electrodes RME may further include a transparent conductive material. For example, each of the electrodes RME may include a material such as ITO, IZO and ITZO. In some embodiments, each of the electrodes RME1 and RME2 may have a structure in which one or more layers of a transparent conductive material and one or more metal layers having high reflectivity may be stacked on one another, or may be made up of a single layer including them. For example, each of the electrodes RME may have a stack structure such as ITO/Ag/ITO/, ITO/Ag/IZO, or ITO/Ag/ITZO/IZO. The electrodes RME may be electrically connected to the light-emitting elements ED and may reflect some of the lights emitted from the light-emitting elements ED toward the upper side of the substrate SUB.

The first insulating layer PAS1 may be disposed on the front surface of the display area DPA, and may be disposed on the via layer VIA and the electrodes RME. The first insulating layer PAS1 may include an insulating material, and can protect the electrodes RME and can insulate different electrodes RME from each other. As the first insulating layer PAS1 may be disposed to cover the electrodes RME before the bank layer BNL may be formed, it may be possible to prevent the electrode RME from being damaged during the process of forming the bank layer BNL. The first insulating layer PAS1 can also prevent that the light-emitting elements ED disposed thereon may be brought into contact with other elements and damaged.

In an embodiment, the first insulating layer PAS1 may have steps so that a portion of the upper surface may be recessed between the electrodes RME spaced apart from one another in the second direction DR2. The light-emitting elements ED may be disposed at the steps of the upper surface of the first insulating layer PAS1, and space may be formed between the light-emitting elements ED and the first insulating layer PAS1.

The first insulating layer PAS1 may include contacts CT1 and CT2 disposed in the subsidiary area SA. The contacts CT1 and CT2 may be disposed to overlap different electrodes RME, respectively. For example, the contacts CT1 and CT2 may include first contacts CT1 disposed to overlap the first electrode RME1, and second contacts CT2 disposed to overlap the second electrode RME2. The first contacts CT1 and the second contacts CT2 may penetrate the first insulating layer PAS1 to expose a portion of the upper surface of the first electrode RME1 or the second electrode RME2 disposed thereunder. Each of the first contact CT1 and the second contact CT2 may further penetrate some of the other insulating layers disposed on the first insulating layer PAS1. The electrodes RME exposed by the contacts CT1 and CT2 may contact the connection electrodes CNE.

The bank layer BNL may be disposed on the first insulating layer PAS1. The bank layer BNL may include portions extended in the first direction DR1 and the second direction DR2 and may surround each of the sub-pixels SPXn. The bank layer BNL may surround the emission area EMA and the subsidiary area SA of each of the sub-pixels SPXn to distinguish between them, and may surround the border of the display area DPA to distinguish between the display area DPA and the non-display area NDA.

The bank layer BNL may have a height similar to the bank patterns BP1 and BP2. In some embodiments, the top surface of the bank layer BNL may have a height higher than that of the bank patterns BP1 and BP2, and the thickness thereof may be equal to or greater than the thicknesses of the bank patterns BP1 and BP2. The bank layer BNL can prevent an ink from overflowing into adjacent sub-pixels SPXn during an inkjet printing process of the process of fabricating the display device 10. The bank layer BNL may include an organic insulating material such as polyimide, like the bank patterns BP1 and BP2.

The light-emitting elements ED may be disposed in the emission area EMA. The light-emitting elements ED may be disposed on the first insulating layer PAS1 between the bank patterns BP1 and BP2. The direction in which the light-emitting elements ED may be extended may be parallel to the upper surface of the substrate SUB. As will be described later, the light-emitting elements ED may include semiconductor layers arranged in the extended direction. The semiconductor layers may be sequentially arranged along a direction parallel to the upper surface of the substrate SUB. It should be understood, however, that the disclosure is not limited thereto. In case that the light-emitting elements ED have a different structure, semiconductor layers may be disposed in a direction perpendicular to the substrate SUB.

The light-emitting elements ED disposed in each of the sub-pixels SPXn may emit light of different wavelength bands depending on the material of the semiconductor layer. It is, however, to be understood that the disclosure is not limited thereto. The light-emitting elements ED disposed in each of the sub-pixels SPXn may include the semiconductor layers made of the same material and may emit light of the same color.

The light-emitting elements ED may be electrically connected to the electrodes RME and the conductive layers under the via layer VIA may contact the connection electrodes CNE: CNE1 and CNE2, and an electric signal may be applied to it so that light of a particular wavelength range can be emitted.

The second insulating layer PAS2 may be disposed on the light-emitting elements ED, the first insulating layer PAS1 and the bank layer BNL. The second insulating layer PAS2 may be extended in the first direction DR1 between the bank patterns BP1 and BP2 and may include a pattern portion disposed on the light-emitting elements ED. The pattern portion may be disposed to partially surround the outer surface of the light-emitting elements ED, and may not cover both sides or both ends of the light-emitting elements ED. The pattern portion may form a linear or island pattern in each sub-pixel SPXn when viewed from the top. The pattern portion of the second insulating layer PAS2 can protect the light-emitting elements ED and can fix the light-emitting elements ED during the process of fabricating the display device 10. The second insulating layer PAS2 may be disposed to fill the space between light-emitting elements ED and the first insulating layer PAS1 thereunder. A portion of the second insulating layer PAS2 may be disposed on the bank layer BNL and in the subsidiary area SA.

The second insulating layer PAS2 may include contacts CT1 and CT2 disposed in the subsidiary area SA. The second insulating layer PAS2 may include a first contact CT1 overlapping the first electrode RME1 and a second contact CT2 overlapping the second electrode RME2. The contacts CT1 and CT2 may penetrate through the second insulating layer PAS2 in addition to the first insulating layer PAS1. Each of the first contacts CT1 and the second contacts CT2 may expose a portion of the upper surface of the first electrode RME1 or the second electrode RME2 thereunder.

The connection electrodes CNE: CNE1 and CNE2 may be disposed on the electrodes RME and the bank patterns BP1 and BP2. The first connection electrode CNE1 may be disposed on the first electrode RME1 and the first bank pattern BP1. The first connection electrode CNE1 may partially overlap the first electrode RME1 and may be disposed from the emission area EMA to the subsidiary area SA beyond the bank layer BNL. The second connection electrode CNE2 may be disposed on the second electrode RME2 and the second bank pattern BP2. The second connection electrode CNE2 may partially overlap the second electrode RME2 and may be disposed from the emission area EMA to the subsidiary area SA beyond the bank layer BNL.

Each of the first connection electrode CNE1 and the second connection electrode CNE2 may be disposed on the second insulating layer PAS2 and may contact the light-emitting elements ED. The first connection electrode CNE1 may partially overlap the first electrode RME1 and may contact first ends of the light-emitting elements ED. The second connection electrode CNE2 may partially overlap the second electrode RME2 and may contact second ends of the light-emitting elements ED. The connection electrodes CNE may be disposed across the emission area EMA and the subsidiary area SA. A portion of each of the connection electrodes CNE that may be disposed in the emission area EMA may contact the light-emitting elements ED, and a part thereof that may be disposed in the subsidiary area SA may be electrically connected to the third conductive layer. The first connection electrode CNE1 may contact the first ends of the light-emitting elements ED, and the second connection electrode CNE2 may contact the second ends of the light-emitting elements ED.

In the display device according to the embodiment, each of the connection electrodes CNE may contact the electrodes RME through the contacts CT1 and CT2 located in the subsidiary area SA. The first connection electrode CNE1 may contact the first electrode RME1 through the first contact CT1 penetrating the first insulating layer PAS1, the second insulating layer PAS2 and the third insulating layer PAS3 in the subsidiary area SA. The second connection electrode CNE2 may contact the second electrode RME1 through the second contact CT2 penetrating the first insulating layer PAS1 and the second insulating layer PAS2 in the subsidiary area SA. The connection electrodes CNE may be electrically connected to the third conductive layer through the respective electrodes RME. The first connection electrode CNE1 may be electrically connected to the first transistor T1 to apply the first supply voltage, and the second connection electrode CNE2 may be electrically connected to the second voltage line VL2 to apply the second supply voltage. Each of the connection electrodes CNE may contact the light-emitting elements ED in the emission area EMA to transmit the supply voltage to the light-emitting elements ED.

It is, however, to be understood that the disclosure is not limited thereto. In some embodiments, the connection electrodes CNE may directly contact the third conductive layer, or may be electrically connected to the third conductive layer through other patterns than the electrodes RME.

The connection electrodes CNE may include a conductive material. For example, the connection electrodes CNE may include ITO, IZO, ITZO, aluminum (Al), etc. For example, the connection electrodes CNE may include a transparent conductive material, and lights emitted from the light-emitting elements ED may transmit the connection electrodes CNE to exit.

The third insulating layer PAS3 may be disposed on the second connection electrode layer CNE2 and the second insulating layer PAS2. The third insulating layer PAS3 may be disposed entirely on the second insulating layer PAS2 to cover the second connection electrode CNE2, and the first connection electrode layer CNE1 may be disposed on the third insulating layer PAS3. The third insulating layer PAS3 may insulate the first connection electrode CNE1 and the second connection electrode CNE2 from each other so that they may not directly contact each other.

The third insulating layer PAS3 may include first contact CT1 disposed in the subsidiary area SA. The first contact CT1 may penetrate through the third insulating layer PAS3 in addition to the first insulating layer PAS1 and the second insulating layer PAS2. The first contact CT1 may expose a portion of the upper surface of the first electrode RME1 thereunder.

Although not shown in the drawings, another insulating layer PAS4 (see FIG. 7) may be further disposed on the third insulating layer PAS3, and the first connection electrode CNE1. The insulating layer can protect the elements disposed on the substrate SUB against the external environment.

Each of the above-described first insulating layer PAS1, second insulating layer PAS2 and third insulating layer PAS3 may include an inorganic insulating material or an organic insulating material. For example, each of the first insulating layer PAS1, the second insulating layer PAS2 and the third insulating layer PAS3 may include an inorganic insulating material, or the first insulating layer PAS1 and the third insulating layer PAS3 may include an inorganic insulating material while the second insulating layer PAS2 may include an organic insulating material. Each of the first insulating layer PAS1, the second insulating layer PAS2 and the third insulating layer PAS3 or at least one of them may be formed in a structure in which insulating layers may be alternately or repeatedly stacked on one another. According to an embodiment of the disclosure, each of the first insulating layer PAS1, the second insulating layer PAS2 and the third insulating layer PAS3 may be made of at least one of silicon oxide (SiOx), silicon nitride (SiNx), and silicon oxynitride (SiOxNy). The first insulating layer PAS1, the second insulating layer PAS2 and the third insulating layer PAS3 may be made of the same material. In other embodiments, some of them may be made of the same material while the other(s) may be made of different material(s), or they may be made of different materials.

Figure 6:
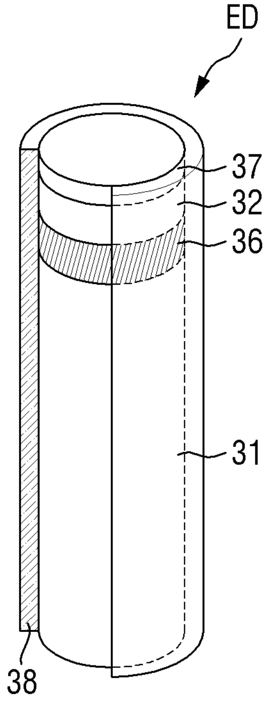
FIG. 6 is a schematic view showing a light-emitting element according to an embodiment of the disclosure.

FIG. 6 is a schematic view showing a light-emitting element according to an embodiment of the disclosure.

Referring to FIG. 6, a light-emitting element ED may be a light-emitting diode. Specifically, the light-emitting element ED may have a size from nanometers to micrometers and may be an inorganic light-emitting diode made of an inorganic material. The light-emitting diode ED may be aligned between two electrodes facing each other as polarities may be created by forming an electric field in a particular direction between the two electrodes.

The light-emitting diode ED according to an embodiment may have a shape extended in one direction. The light-emitting element ED may have a shape of a cylinder, a rod, a wire, a tube, etc. It is to be understood that the shape of the light-emitting diode ED is not limited thereto. The light-emitting diode ED may have a variety of shapes including a polygonal column shape such as a cube, a cuboid and a hexagonal column, or a shape that may be extended in a direction with partially inclined outer surfaces.

The light-emitting diode ED may include semiconductor layers doped with a dopant of a conductive type (e.g., p-type or n-type). The semiconductor layers may emit light of a certain wavelength band by transmitting an electric signal applied from an external power source. The light-emitting diode ED may include a first semiconductor layer 31, a second semiconductor layer 32, an emissive layer 36, an electrode layer 37, and an insulating film 38.

The first semiconductor layer 31 may be an n-type semiconductor. The first semiconductor layer 31 may include a semiconductor material having the following chemical formula: $Al_xGa_yIn_{1-x-y}N$ ($0 \le x \le 1$, $0 \le y \le 1$, $0 \le x+y \le 1$). For example, the first semiconductor layer 31 may be one or more of AlGaInN, GaN, AlGaN, InGaN, AlN and InN doped with n-type dopant. The n-type dopant doped into the first semiconductor layer 31 may be Si, Ge, Sn, Se, etc.

The second semiconductor layer 32 may be disposed above the first semiconductor layer 31 with the emissive layer 36 therebetween. The second semiconductor layer 32 may be a p-type semiconductor, and may include a semiconductor material having the following chemical formula: $Al_xGa_yIn_{1-x-y}N$ ($0 \le x \le 1$, $0 \le y \le 1$, $0 \le x+y \le 1$). For example, the second semiconductor layer 32 may be one or more of AlGaInN, GaN, AlGaN, InGaN, AlN and InN doped with p-type dopant. The p-type dopant doped into the second semiconductor layer 32 may be Mg, Zn, Ca, Ba, etc.

Although each of the first semiconductor layer 31 and the second semiconductor layer 32 may be implemented as a signal layer in the drawings, the disclosure is not limited thereto. Depending on the material of the emissive layer 36, the first semiconductor layer 31 and the second semiconductor layer 32 may further include a larger number of layers, e.g., a clad layer or a tensile strain barrier reducing (TSBR) layer. For example, the light-emitting elements ED may further include another semiconductor layer disposed between the first semiconductor layer 31 and the emissive layer 36 or between the second semiconductor layer 32 and the emissive layer 36. The semiconductor layer disposed between the first semiconductor layer 31 and the emissive layer 36 may be one or more of AlGaInN, GaN, AlGaN, InGaN, AlN, and InN doped with an n-type dopant. The semiconductor layer disposed between the second semiconductor layer 32 and the emissive layer 36 may be one or more of AlGaInN, GaN, AlGaN, InGaN, AlN, and InN doped with a p-type dopant.

The emissive layer 36 may be disposed between the first semiconductor layer 31 and the second semiconductor layer 32. The emissive layer 36 may include a material having a single or multiple quantum well structure. In case that the emissive layer 36 includes a material having the multiple quantum well structure, the structure may include quantum layers and well layers alternately stacked on one another. The emissive layer 36 may emit light as electron-hole pairs may be combined therein in response to an electrical signal applied through the first semiconductor layer 31 and the second semiconductor layer 32. The emissive layer 36 may include a material such as AlGaN, AlGaInN, and InGaN. In particular, in case that the emissive layer 36 has a multi-quantum well structure in which quantum layers and well layers may be alternately stacked on one another, the quantum layers may include AlGaN or AlGaInN, and the well layers may include a material such as GaN and AlGaN.

The emissive layer 36 may have a structure in which a semiconductor material having a large band gap energy and a semiconductor material having a small band gap energy may be alternately stacked on one another, and may include other Group III to Group V semiconductor materials depending on the wavelength range of the emitted light. Accordingly, the light emitted from the emissive layer 36 is not limited to the light of the blue wavelength band. The emissive layer 36 may emit light of red or green wavelength band in some implementations.

The electrode layer 37 may be an ohmic connection electrode. It is, however, to be understood that the disclosure is not limited thereto. The electrode layer 37 may be a Schottky connection electrode. The light-emitting diode ED may include at least one electrode layer 37. The light-emitting diode ED may include one or more electrode layers 37. It is, however, to be understood that the disclosure is not limited thereto. The electrode layer 37 may be eliminated.

The electrode layer 37 can reduce the resistance between the light-emitting element ED and the electrodes or the connection electrodes in case that the light-emitting element ED is electrically connected to the electrodes or the connection electrodes in the display device 10. The electrode layer 37 may include a metal having conductivity. For example, the electrode layer 37 may include at least one of aluminum (Al), titanium (Ti), indium (In), gold (Au), silver (Ag), ITO, IZO and ITZO.

The insulating film 38 may be disposed to surround the outer surfaces of the semiconductor layers and electrode layers described above. For example, the insulating film 38 may be disposed to surround at least the outer surface of the emissive layer 36, with both ends of the light-emitting element ED in the longitudinal direction exposed. A portion of the upper surface of the insulating film 38 may be rounded in cross section, which may be adjacent to at least one of the ends of the light-emitting diode ED.

The insulating film 38 may include materials having insulating properties, for example, at least one of: silicon oxide (SiOx), silicon nitride (SiNx), silicon oxynitride (SiOxNy), aluminum nitride (AlNx), aluminum oxide (AlOx), zirconium oxide (ZrOx), hafnium oxide (HfOx), and titanium oxide (TiOx). Although the insulating film 38 may be formed as a single layer in the drawings, the disclosure is not limited thereto. In some embodiments, the insulating film 38 may be made up of a multilayer structure in which multiple layers may be stacked on one another.

The insulating film 38 can protect the semiconductor layers and the electrode layer of the light-emitting elements ED. The insulating film 30 can prevent an electrical short-circuit that may occur in the emissive layer 36 if it comes in direct contact with an electrode through which an electric signal may be transmitted to the light-emitting diode ED. The insulating film 38 can prevent a decrease in luminous efficiency.

The outer surface of the insulating film 38 may be subjected to surface treatment. The light-emitting elements ED may be dispersed in an ink, and the ink may be sprayed onto the electrode. In doing so, a surface treatment may be applied to the insulating film 38 so that it becomes hydrophobic or hydrophilic in order to keep the light-emitting elements ED dispersed in the ink from being aggregated with one another.

According to an embodiment of the disclosure, the display device 10 may further include a color control layer CCR (see FIG. 7) and a color filter layer CFL (see FIG. 6) disposed over the light-emitting elements ED. The lights emitted from the light-emitting elements ED may exit through the color control layer CCR and the color filter layer CFL. Even if the light-emitting elements ED of the same type may be disposed in different sub-pixel SPXn, the different sub-pixels SPXn may output lights of different colors.

Figure 7:
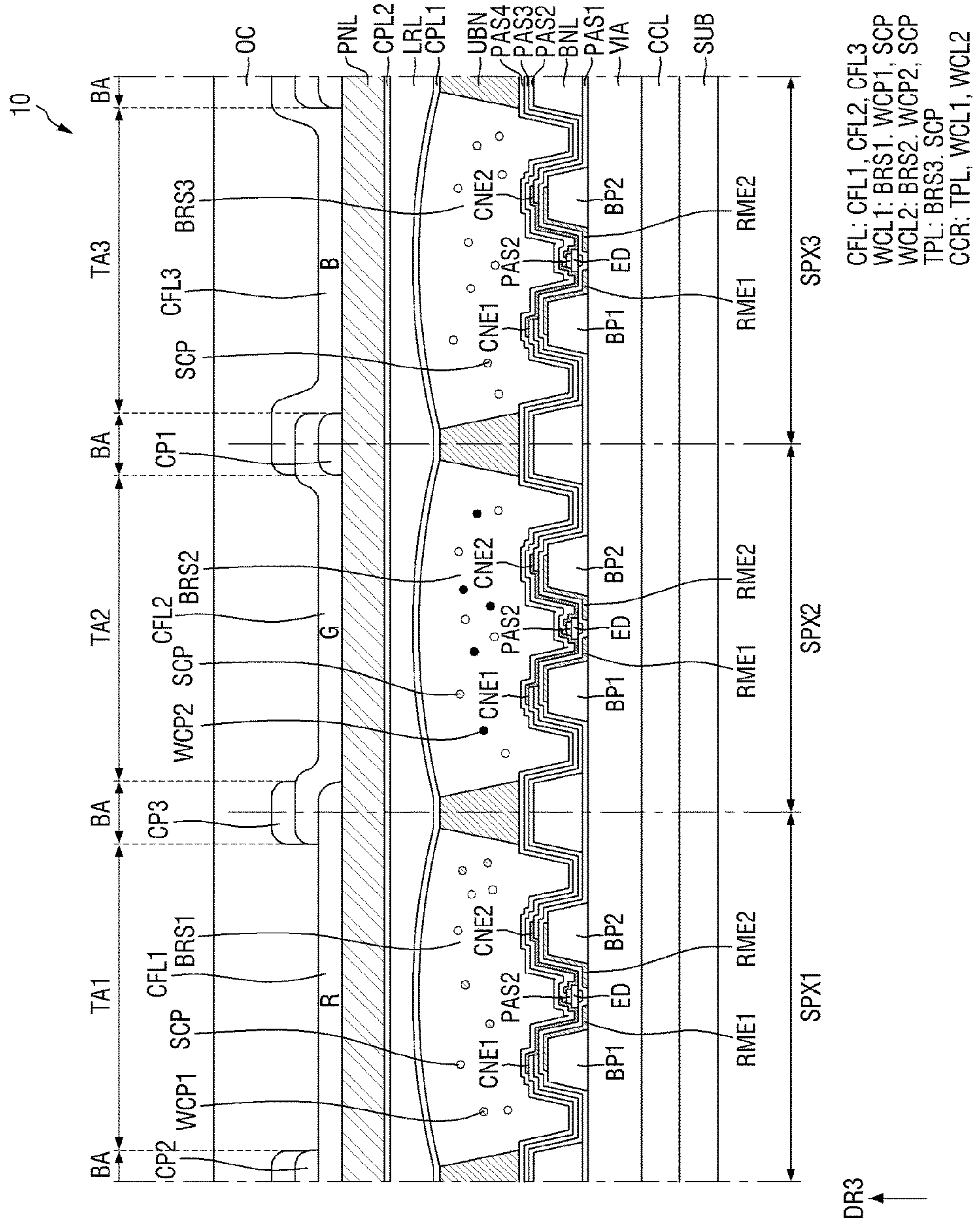
FIG. 7 is a schematic cross-sectional view of a display device according to an embodiment of the disclosure.

FIG. 7 is a schematic cross-sectional view of a display device according to an embodiment of the disclosure.

Referring to FIG. 7, the display device 10 may include light-emitting elements ED disposed on a substrate SUB, and a color control layer CCR and a color filter layer CFL disposed over them. The display device 10 may further include layers disposed between the color control layer CCR and the color filter layer CFL. Hereinafter, layers disposed over the light-emitting elements ED of the display device 10 will be described.

The fourth insulating layer PAS4 may be disposed on the third insulating layer PAS3, the connection electrodes CNE1 and CNE2, and the bank layer BNL. The fourth insulating layer PAS4 can protect the layers disposed on the substrate SUB. It may be noted that the fourth insulating layer PAS4 may be eliminated.

An upper bank layer UBN, a color control layer CCR, color patterns CP1, CP2 and CP3, and a color filter layer CFL may be disposed on the fourth insulating layer PAS4. Capping layers CPL1 and CPL2, a low-refractive layer LRL and a planarization layer PNL may be disposed between the color control layer CCR and the color filter layer CFL. An overcoat layer OC may be disposed on the color filter layer CFL.

The display device 10 may include light-transmitting areas TA1, TA2 and TA3 where the color filter layer CFL may be disposed to allow lights to exit, and a light-blocking area BA between the light-transmitting areas TA1, TA2 and TA3 where no light exits. The light-transmitting areas TA1, TA2 and TA3 may be located in line with certain portions of the emission area EMA of each of the sub-pixels PXn, and the light-blocking area BA may be the other area than the light-transmitting areas TA1, TA2 and TA3.

The upper bank layer UBN may be disposed on the fourth insulating layer PAS4 to overlap the bank layer BNL. The upper bank layer UBN may be disposed in a lattice pattern, including portions extended in the first direction DR1 and the second direction DR2 when viewed from the top. The upper bank layer UBN may surround the emission area EMA or the area where the light-emitting elements ED may be disposed, and may be separate the sub-pixels SPXn each including the emission area EMA and the subsidiary area SA from another, together with the above-described bank layer BNL. The upper bank layer UBN may define a space in which the color control layer CCR may be disposed.

According to an embodiment of the disclosure, the upper bank layer UBN may be made of a photosensitive resin composition to be described later and may have a surface energy in a range of about 13 to about 25 dyne/cm. According to an embodiment of the disclosure, a surface energy of the upper bank layer UBN may be in a range of about 14 to about 17 dyne/cm. A surface energy of the fourth insulating layer PAS4 partitioned by the upper bank layer UBN may be in a range of about 40 to about 70 dyne/cm, and in an embodiment, the surface energy of the fourth insulating layer PAS4 may be in a range of about 50 to about 60 dyne/cm. Accordingly, it may be possible to prevent that the upper bank layer UBN is made hydrophobic and accordingly the ink overflows into adjacent sub-pixels in case that the ink of the color control layer CCR is applied. The surface of the fourth insulating layer PAS4 on which the ink may be applied may allow the ink to spread well.

The color control layer CCR may be disposed on the fourth insulating layer PAS4 in the space surrounded by the upper bank layer UBN. The color control layer CCR may directly contact the surface of the fourth insulating layer PAS4. The color control layer CCR may be disposed in the light-transmitting areas TA1, TA2 and TA3 surrounded by the upper bank layer UBN to form an island-like pattern in the display area DPA. It should be understood, however, that the disclosure is not limited thereto. The color control layer CCR may be extended in a direction and disposed across the sub-pixels SPXn to form a linear pattern.

In an embodiment where the light-emitting elements ED of each of the sub-pixels PXn emit blue light of the third color, the color control layer CCR may include a first wavelength conversion layer WCL1 disposed in the first sub-pixel SPX1 in line with the first light-transmitting area TA1, a second wavelength conversion layer WCL2 disposed in the second sub-pixel SPX2 in line with the second light-transmitting area TA2, and a transparent layer TPL disposed in the third sub-pixel SPX3 in line with the third light-transmitting area TA3.

The first wavelength conversion layer WCL1 may include a first base resin BRS1 and first wavelength-converting particles WCP1 dispersed in the first base resin BRS1. The second wavelength conversion layer WCL2 may include a second base resin BRS2 and second wavelength-converting particles WCP2 dispersed in the second base resin BRS2. The first wavelength conversion layer WCL1 and the second wavelength conversion layer WCL2 convert and transmit the wavelength of the blue light of the third color incident from the light-emitting elements ED. The first wavelength conversion layer WCL1 and the second wavelength conversion layer WCL2 may further include scattering particles SCP included in each base resin, and the scattering particles SCP can increase wavelength conversion efficiency.

The transparent layer TPL may include a base resin BRS3 and scattering particles SCP dispersed in the third base resin BSR3. The transparent layer TPL transmits the wavelength of the blue light of the third color incident from the light-emitting elements ED as it may be. The scattering particles SCP of the transparent layer TPL may adjust an emission path of exiting light through the transparent layer TPL. The transparent layer TPL may include no wavelength conversion material.

The scattering particles SCP may be metal oxide particles or organic particles. Examples of the metal oxide may include titanium oxide ($TiO_2$), zirconium oxide ($ZrO_2$), aluminum oxide ($Al_2O_3$), indium oxide ($In_2O_3$), zinc oxide (ZnO), tin oxide ($SnO_2$), etc. Examples of the material of the organic particles may include an acrylic resin, a urethane resin, etc.

The first to third base resins BRS1, BRS2 and BRS3 may include a transparent organic material. For example, the first to third base resins BRS1, BRS2 and BRS3 may include an epoxy resin, an acrylic resin, a cardo resin, an imide resin, or the like. The first to third base resins BRS1, BRS2 and BRS3 may be made of, but are not limited to, the same material.

The first wavelength-converting particles WCP1 may convert the blue light of the third color into the red light of the first color, and the second wavelength-converting particles WCP2 may convert the blue light of the third color into the green light of the second color. The first wavelength-converting particles WCP1 and the second wavelength-converting particles WCP2 may be quantum dots, quantum rods, phosphors, etc. The quantum dots may include IV nanocrystals, II-VI compound nanocrystals, III-V compound nanocrystals, IV-VI nanocrystals, or combinations thereof.

In some embodiments, the color control layer CCR may be formed via an inkjet printing process or a photoresist process. The color control layer CCR may be formed via drying or exposure and development processes after a material forming it may be sprayed or applied in the space surrounded by the upper bank layer UBN. For example, in an embodiment in which the color control layer CCR may be formed via an inkjet printing process, the upper surface of each layer of the color control layer CCR may be formed to be curved, so that the edge thereof that may be adjacent to the upper bank layer UBN may be higher than the center thereof in the drawings. It is, however, to be understood that the disclosure is not limited thereto. In an embodiment in which the color control layer CCR may be formed via a photoresist process, the upper surface of each layer of the color control layer CCR may be formed to be flat, so that the edge thereof that may be adjacent to the upper bank layer UBN may be parallel to the upper surface of the upper bank layer UBN, or the center of the color control layer CCR may be higher than it, unlike the example shown in the drawings.

While the light-emitting elements ED of different sub-pixels SPXn may emit light of the same color, i.e., the blue light of the third color, the lights of different colors may exit from the different sub-pixels SPXn. For example, the light emitted from the light-emitting elements ED disposed in the first sub-pixel SPX1 may be incident on the first wavelength conversion layer WCL1, the light emitted from the light-emitting elements ED disposed in the second sub-pixel SPX2 may be incident on the second wavelength conversion layer WCL2, and the light emitted from the light-emitting elements ED disposed in the third sub-pixel SPX3 may be incident on the transparent layer TPL.

The light incident on the first wavelength conversion layer WCL1 may be converted into red light, the light incident on the second wavelength conversion layer WCL2 may be converted into green light, and the light incident on the transparent layer TPL may transmit it as the same blue light without wavelength conversion. Although the sub-pixels PXn include the light-emitting elements ED that emit light of the same color, lights of different colors can be output by disposing the color control layer CCR over them.

The first capping layer CPL1 may be disposed on the color control layer CCR and the upper bank layer UBN. The first capping layer CPL1 can prevent impurities such as moisture and air from permeating from the outside to damage or contaminate the color control layer CCR. The first capping layer CPL1 may include an inorganic insulating material.

The low-refractive layer LRL may be disposed on the first capping layer CPL1. The low-refractive layer LRL may be an optical layer that recycles lights which have passed through the color control layer CCR, and can improve the emission efficiency and the color purity of the display device 10. The low-refractive layer LRL may be made of an organic material having a low refractive index, and may provide a flat surface over the color control layer CCR and the upper bank layer UBN having different heights.

The second capping layer CPL2 may be disposed on the low-refractive layer LRL, and can prevent impurities such as moisture and air from penetrating from the outside to damage or contaminate the low-refractive layer LRL. The second capping layer CPL2 may include an inorganic insulating material similar to the first capping layer CPL1.

The planarization layer PNL may be disposed across the entire display area DPA and the entire non-display area NDA on the second capping layer CPL2. The planarization layer PNL may overlap the color control layer CCR in the display area DPA, and may overlap a dam to be described later in the non-display area NDA.

The planarization layer PNL can protect the elements disposed on the substrate SUB, in addition to the capping layers CPL1 and CPL2 and the low-refractive layer LRL, and can partially provide a flat surface over them having different heights. In particular, the planarization layer PNL may provide a flat surface over the color control layer CCR, the upper bank layer UBN and the bank layer BNL thereunder which have different heights in the display area DPA, so that the color filter layer CFL can be formed on the flat surface.

The color filter layer CFL may be disposed on the planarization layer PNL. The color filter layer CFL may be disposed in the light-transmitting areas TA1, TA2 and TA3, and may be partially disposed in the light-blocking area BA. A portion of the color filter layer CFL may overlap another part or the color patterns CP1, CP2 and CP3 in the light-blocking area BA. Lights may exit in the light-transmitting areas TA1, TA2 and TA3 where the color filter layer CFL do not overlap with another. Light may be blocked in the light-blocking area BA where the color filter layer CFL overlaps with another or the color patterns CP1, CP2 and CP3 may be disposed.

The color filter layer CFL may include a first color filter CFL1 disposed in the first sub-pixel SPX1, a second color filter CFL2 disposed in the second sub-pixel SPX2, and a third color filter CFL3 disposed in the third sub-pixel SPX3. Each of the color filters CFL1, CFL2, and CFL3 may be formed in a linear pattern disposed in the light-transmitting areas TA1, TA2, and TA3 or the emission areas EMA. It is, however, to be understood that the disclosure is not limited thereto. The color filters CFL1, CFL2, and CFL3 may be disposed in line with the light-transmitting areas TA1, TA2, and TA3, respectively, to form an island-like pattern.

The color filter layer CFL may include a colorant such as a dye and a pigment that absorbs lights in other wavelength ranges than a particular wavelength range. The color filters CFL1, CFL2, and CFL3 may be disposed in the sub-pixels PXn, respectively, to transmit only some of the light incident on the color filters CFL1, CFL2, and CFL3 in the respective sub-pixels PXn. The sub-pixels PXn of the display device 10 may selectively display only the lights transmitted through the color filters CFL1, CFL2, and CFL3. According to an embodiment of the disclosure, the first color filter CFL1 may be a red color filter layer, the second color filter CFL2 may be a green color filter layer, and the third color filter CFL3 may be a blue color filter layer. The lights emitted from the light-emitting elements ED may exit through the color control layer CCR and the color filter layer CFL.

The color patterns CP1, CP2 and CP3 may be disposed on the planarization layer PNL or the color filter layer CFL. The color patterns CP1, CP2 and CP3 may include the same material as the color filter layer CFL and may be disposed in the light-blocking area BA. In the light-blocking area BA, the color patterns CP1, CP2 and CP3 and the different color filters CFL1, CFL2 and CFL3 may be disposed such that they may be stacked on one another, and transmission of light can be blocked in the region where they may be stacked on one another.

The first color pattern CP1 may include the same material as that of the first color filter CFL1 and may be disposed in the light-blocking area BA. The first color pattern CP1 may be disposed directly on the planarization layer PNL in the light-blocking area BA but may not be disposed in the light-blocking area BA adjacent to the first light-transmitting area TA1 of the first sub-pixel SPX1. The first color pattern CP1 may be disposed in the light-blocking area BA between the second sub-pixel SPX2 and the third sub-pixel SPX3. The first color filter CFL1 may be disposed in the light-blocking area BA around the first sub-pixel SPX1.

The second color pattern CP2 may include the same material as that of the second color filter CFL2 and may be disposed in the light-blocking area BA. The second color pattern CP2 may be disposed directly on the planarization layer PNL in the light-blocking area BA but may not be disposed in the light-blocking area BA adjacent to the second light-transmitting area TA2 of the second sub-pixel SPX2. The second color pattern CP2 may be disposed in the light-blocking area BA between the first sub-pixel SPX1 and the third sub-pixel SPX3, or at the boundary between the outermost sub-pixel SPXn of the display area DPA and the non-display area NDA. The second color filter CFL2 may be disposed in the light-blocking area BA around the second sub-pixel SPX2.

Similarly, the third color pattern CP3 may include the same material as that of the third color filter CFL3 and may be disposed in the light-blocking area BA. The third color pattern CP3 may be disposed directly on the planarization layer PNL in the light-blocking area BA but may not be disposed in the light-blocking area BA adjacent to the third light-transmitting area TA3 of the third sub-pixel SPX3. The third color pattern CP3 may be disposed in the light-blocking area BA between the first sub-pixel SPX1 and the second sub-pixel SPX2. The third color filter CFL3 may be disposed in the light-blocking area BA around the third sub-pixel SPX3.

In the display device 10, the region where the bank layer BNL and the upper bank layer UBN overlap each other may be the light-blocking area BA. In the light-blocking area BA, each of the first color pattern CP1, the second color pattern CP2 and the third color pattern CP3 may be disposed to overlap at least one of the color filters CFL1, CFL2, and CFL3 including different color materials. For example, the first color pattern CP1 may be disposed to overlap the second color filter CFL2 and the third color filter CFL3, the second color pattern CP2 may be disposed to overlap the first color filter CFL1 and the third color filter CFL3, and the third color pattern CP3 may be disposed to overlap the first color filter CFL1 and the second color filter CFL2. In each of the light-blocking areas BA, the color patterns CP1, CP2 and CP3 having different colorants and the different color filters CFL1, CFL2 and CFL3 overlap each other, so that transmission of light can be blocked.

The color patterns CP1, CP2 and CP3 may be stacked on the color filters CFL1, CFL2 and CFL3, and color mixing between adjacent areas can be prevented by the materials including different colorants. Since the color patterns CP1, CP2 and CP3 include the same material as the color filters CFL1, CFL2 and CFL3, external light or reflected light passing through the light-blocking area BA may have a wavelength band of a certain color. The eye color sensibility that a user's eyes perceive varies depending on the color of the light. In particular, the light in the blue wavelength band may be perceived less sensitively to a user than the light in the green wavelength band and the light in the red wavelength band. In the display device 10, the color patterns CP1, CP2 and CP3 may be disposed in the light-blocking area BA, and thus the transmission of light can be blocked and the user can perceive the reflected light less sensitively, so that it may be possible to reduce reflected light by external light by absorbing a portion of the light introduced from the outside of the display device 10. The overcoat layer OC may be disposed on the color filter layer CFL and the color patterns CP1, CP2 and CP3. The overcoat layer OC may be disposed throughout the entire display area DPA, and may be partially disposed in the non-display area NDA. The overcoat layer OC may include an organic insulating material to protect the elements disposed in the display area DPA from the outside.

The display device 10 according to the embodiment of the disclosure may include the color control layer CCR and the color filter layer CFL disposed over the light-emitting elements ED, so that it can display lights of different colors even if the same type of light-emitting elements ED may be disposed in different sub-pixels SPXn.

For example, the light-emitting elements ED disposed in the first sub-pixel SPX1 may emit the blue light of the third color, and the light may be incident on the first wavelength conversion layer WCL1 through the fourth insulating layer PAS4. The first base resin BRS1 of the first wavelength conversion layer WCL1 may be made of a transparent material, and some of the lights may pass through the first base resin BRS1 and may be incident on the first capping layer CPL1 disposed thereon. At least some of the lights may be incident on the scattering particles SCP and the first wavelength-converting particles WCP1 dispersed in the first base resin BRS1. The light may be scattered and the wavelength may be converted into the wavelength of red light, such that the red light may be incident on the first capping layer CPL1. Lights incident on the first capping layer CPL1 may pass through the low-refractive layer LRL, the second capping layer CPL2 and the planarization layer PNL and may be incident on the first color filter CFL1. The first color filter CFL1 can block the transmission of other lights except red light. Accordingly, red light may be emitted from the first sub-pixel SPX1.

Similarly, lights emitted from the light-emitting elements ED disposed in the second sub-pixel SPX2 may pass through the fourth insulating layer PAS4, the second wavelength conversion layer WCL2, the first capping layer CPL1, the low-refractive layer LRL, the second capping layer CPL2, the planarization layer PNL and the second color filter CFL2, to exit as green lights.

The light-emitting elements ED disposed in the third sub-pixel SPX3 may emit blue light of the third color, and the light may be incident on the light-transmitting layer through the fourth insulating layer PAS4. The third base resin BRS3 of the transparent layer TPL may be made of a transparent material, and some of the lights may pass through the third base resin BRS3 and may be incident on the first capping layer CPL1 disposed thereon. Lights incident on the first capping layer CPL1 may pass through the low-refractive layer LRL, the second capping layer CPL2 and the planarization layer PNL and may be incident on the third color filter CFL3. The third color filter CFL3 can block the transmission of other lights except blue light. Accordingly, blue light may be emitted from the third sub-pixel SPX3.

Incidentally, the above-described color control layer CCR may be produced by inkjet printing in each sub-pixel SPXn divided by the upper bank layer UBN. The upper bank layer UBN may be produced via coating, pre-bake, exposure, development, and post-bake processes. In this regard, uncured residues may be effused to the surface of the fourth insulating layer PAS4 on which the ink may be applied due to outgassing during the post-baking process of the upper bank layer UBN. As a result, the surface of the fourth insulating layer PAS4 may become hydrophobic. Accordingly, the spreadability of the ink applied on the fourth insulating layer PAS4 may be deteriorated.

Hereinafter, the photosensitive resin composition according to this embodiment which can prevent uncured residues from being effused by improving the development of the upper bank layer UBN, and the display device including the same will be described.

The photosensitive resin composition according to the embodiment of the disclosure may include a photopolymerizable monomer, a photopolymerization initiator, a binder, a solvent, and a liquid-repellent agent. In an embodiment, the photosensitive resin composition may further include scattering particles.

The photopolymerizable monomer may cause a polymerization reaction upon exposure to form a pattern. The photopolymerizable monomer may include monofunctional esters of methacrylic acid having at least one ethylenically unsaturated double bond, polyfunctional esters of methacrylic acid having at least one ethylenically unsaturated double bond, or a combination thereof. In case that the photopolymerizable compound has an ethylenically unsaturated double bond, sufficient polymerization can be achieved upon exposure, so that a pattern having excellent heat resistance, light resistance and chemical resistance can be formed.

According to an embodiment of the disclosure, the photopolymerizable monomer may include ethylene glycol di(meth)acrylate, diethylene glycol di(meth)acrylate, triethylene glycol di(meth)acrylate, propylene glycol di(meth) acrylate, neopentyl glycol di(meth)acrylate, 1,4-butanediol di(meth)acrylate, 1,6-hexanediol di(meth)acrylate, bisphenol-A di(meth)acrylate, pentaerythritol di(meth)acrylate, pentaerythritol tri(meth)acrylate, pentaerythritol tetra(meth) acrylate rate, pentaerythritol hexa(meth)acrylate, dipentaerythritol di(meth)acrylate, dipentaerythritol tri(meth) acrylate, dipentaerythritol penta(meth)acrylate, dipentaerythritol hexa(meth)acrylate, bisphenol-A epoxy (meth)acrylate, ethylene glycol monomethyl ether (meth) acrylate, trimethylol propane tri(meth)acrylate, tris (meth) acryloyloxyethyl phosphate, novolac epoxy (meth)acrylate, or a combination thereof.

A content of the photopolymerizable monomer may be in a range of about 20 to about 50 parts by weight per 100 parts by weight of the total solid content of the photosensitive resin composition. According to an embodiment of the disclosure, the content of the photopolymerization monomer may be in a range of about 35 to about 45 parts by weight per 100 parts by weight of the total solid content of the photosensitive resin composition, and in which case, pattern characteristics and development can be improved.

The photopolymerization initiator may initiate polymerization of the photopolymerizable monomer by a wavelength such as visible light, ultraviolet light, and far ultraviolet light. The photosensitive resin composition may include a photopolymerization initiator to have a high degree of photocurability.

The photopolymerization initiator may include an oxime-based compound, an acetophenone-based compound, a thioxanthone-based compound, a benzophenone-based compound, or a combination thereof.

The oxime-based compound may include, for example, 1,2-octanedione, 2-dimethylamino-2-(4-methylbenzyl)-1-(4-morpholin-4-yl-phenyl)-butan-1-one, 1-(4-phenylsulfanyl) phenyl)-butane-1,2-dione-2-oxime-O-benzoate, 1-(4-phenylsulfanylphenyl)-octane-1,2-dione-2-oxime-O-benzoate, 1-(4-phenylsulfanylphenyl)-octane-1-oneoxime-O-acetate, 1-(4-phenylsulfanylphenyl)-butan-1-one-2-oxime-O-acetate, 2-(O-benzoyloxime)-1-[4-(phenylthio) phenyl]-1,2-octandione, 1-(0-acetyloxime)-1-[9-ethyl-6-(2-methylbenzoyl)-9H-carbazol-3-yl]ethanone, O-ethoxycarbonyl-α-oxyamino-1-phenylpropan-1-one, or a combination thereof.

The acetophenone-based compound may include, for example, 4-phenoxy dichloroacetophenone, 4-t-butyl dichloroacetophenone, 4-t-butyl trichloroacetophenone, 2,2-diethoxyacetophenone, 2-hydroxy-2-methyl-1-phenyl-propane-1-one, 1-(4-isopropylphenyl)-2-hydroxy-2-methyl-propan-1-one, 1-(4-dodecylphenyl)-2-hydroxy-2-methylpropan-1-one, 4-(2-hydroxyethoxy)-phenyl-(2-hydroxy-2-propyl) ketone, 1-hydroxy cyclohexyl phenyl ketone and 2-methyl-1-[4-(methylthio)phenyl]-2-morpholino-propan-1-one, or a combination thereof.

The thioxanthone-based compound may include, for example, thioxanthone, 2-chlorothioxanthone, 2-methylthioxanthone, isopropyl thioxanthone, 2,4-diethyl thioxanthone, 2,4-diisopropyl thioxanthone, or a combination thereof.

The benzophenone-based compound may include, for example, benzophenone, benzoyl benzoic acid, benzoyl benzoic acid methyl ester, 4-phenyl benzophenone, hydroxybenzophenone, 4-benzoyl-4'-methyl diphenyl sulfide, 3,3'-dimethyl-4-methoxy benzophenone, or a combination thereof.

A content of the photopolymerization initiator may be in a range of about 1 part by weight to about 5 parts by weight, per 100 parts by weight of the total solid content of the photosensitive resin composition, and in which case, photopolymerization of the photopolymerizable monomer may sufficiently occur upon exposure.

The binder may adjust the viscosity of the photosensitive resin composition to improve adhesion to the substrate and to have excellent surface smoothness during the developing process.

The binder may be alkali-soluble. The binder may include an epoxy resin, an acrylic resin, or a combination thereof.

The epoxy resin can improve heat resistance and allow a pattern to be formed with a desired resolution during the development process. The epoxy resin may include, for example, a phenol novolac epoxy resin, a tetramethyl biphenyl epoxy resin, a bisphenol A-type epoxy resin, a bisphenol F-type epoxy resin, an alicyclic epoxy resin, or a combination thereof. The epoxy equivalent weight of the epoxy resin may be 150 to 200 g/eq.

The acrylic resin can improve heat resistance and transmittance. The acrylic resin may be a copolymer of a first ethylenically unsaturated monomer and a second ethylenically unsaturated monomer copolymerizable therewith, and may be a resin including one or more acrylic repeating units. The first ethylenically unsaturated monomer may be an ethylenically unsaturated monomer containing at least one carboxyl group. The first ethylenically unsaturated monomer may include, for example, acrylic acid, methacrylic acid, maleic acid, itaconic acid, fumaric acid, or a combination thereof. A content of the first ethylenically unsaturated monomer may be approximately 5 to approximately 50 parts by weight per 100 parts by weight of the total acrylic resin.

The second ethylenically unsaturated monomer may include aromatic vinyl compounds such as styrene, (alpha)-methylstyrene, vinyltoluene and vinylbenzylmethyl ether; unsaturated carboxylic acid ester compounds such as methyl methacrylate, ethyl methacrylate, butyl methacrylate, 2-hydroxyethyl methacrylate, 2-hydroxy butyl methacrylate, benzyl methacrylate, cyclohexyl methacrylate and phenyl methacrylate; unsaturated carboxylic acid amino alkyl ester compounds such as 2-aminoethyl methacrylate and 2-dimethylaminoethyl methacrylate; carboxylic acid vinyl ester compounds such as vinyl acetate and a vinyl benzoate; unsaturated carboxylic acid glycidyl ester compounds such as glycidyl methacrylate; vinyl cyanide compounds such as methacrylonitrile; unsaturated amide compounds such as methacrylamide; or a combination thereof.

According to an embodiment of the disclosure, the acrylic resin may include methacrylic acid/benzyl methacrylate copolymer, methacrylic acid/benzyl methacrylate/styrene copolymer, methacrylic acid/benzyl methacrylate/2-hydroxyethyl methacrylate copolymer, methacrylic acid/benzyl methacrylate/styrene/2-hydroxyethyl methacrylate polymer, or a combination thereof.

A weight-average molecular weight of the binder may be in a range of about 6,000 g/mol to about 50,000 g/mol, and in which case, the photosensitive resin composition can have excellent physical and chemical properties, appropriate viscosity, and excellent adhesion to the substrate. A content of the binder may be in a range of about 50 to about 60 parts by weight per 100 parts by weight of the total solid content of the photosensitive resin composition.

The solvent may be a material having compatibility with, but not reacting with, the photopolymerizable monomer, the photopolymerization initiator, the scattering particles, and the binder.

The solvent may be a compound, for example, alcohols such as methanol and ethanol; ethers such as dichloroethyl ether, n-butyl ether, diisoamyl ether, methylphenyl ether and tetrahydrofuran; glycol ethers such as ethylene glycol methyl ether, ethylene glycol ethyl ether and propylene glycol methyl ether; cellosolve acetates such as methyl cellosolve acetate, ethyl cellosolve acetate and diethyl cellosolve acetate; carbitols such as methylethyl carbitol, diethyl carbitol, diethylene glycol monomethyl ether, diethylene glycol monoethyl ether, diethylene glycol dimethyl ether, diethylene glycol methyl ethyl ether and diethylene glycol diethyl ether; propylene glycol alkyl ether acetates such as propylene glycol methyl ether acetate, propylene glycol monoethyl ether acetate and propylene glycol propyl ether acetate; aromatic hydrocarbons such as toluene and xylene; ketones such as methyl ethyl ketone, cyclohexanone, 4-hydroxy-4-methyl-2-pentanone, methyl-n-propyl ketone, methyl-n-butyl kenone, methyl-n-amyl ketone, and 2-heptanone; saturated aliphatic monocarboxylic acid alkyl esters such as ethyl acetate, n-butyl acetate and isobutyl acetate; lactic acid alkyl esters such as methyl lactate and ethyl lactate; hydroxyacetic acid alkyl esters such as methyl hydroxyacetate, ethyl hydroxyacetate and butyl hydroxyacetate; acetic acid alkoxyalkyl esters such as methoxymethyl acetate, methoxyethyl acetate, methoxybutyl acetate, ethoxymethyl acetate and ethoxyethyl acetate; 3-hydroxypropionic acid alkyl esters such as methyl 3-hydroxypropionate and ethyl 3-hydroxypropionate; 3-alkoxypropionic acid alkyl esters such as methyl 3-methoxypropionate, ethyl 3-methoxypropionate, ethyl 3-ethoxypropionate and methyl 3-ethoxypropionate; 2-hydroxypropionic acid alkyl esters such as methyl 2-hydroxypropionate, ethyl 2-hydroxypropionate and propyl 2-hydroxypropionate; 2-alkoxypropionic acid alkyl esters such as methyl 2-methoxypropionate, ethyl 2-methoxypropionate, ethyl 2-ethoxypropionate and methyl 2-ethoxypropionate; 2-hydroxy-2-methylpropionic acid alkyl esters such as methyl 2-hydroxy-2-methylpropionate and ethyl 2-hydroxy-2-methylpropionate; 2-alkoxy-2-methylpropionic acid alkyl esters such as methyl 2-methoxy-2-methylpropionate and ethyl 2-ethoxy-2-m ethylpropionate; esters such as 2-hydroxyethyl propionate, 2-hydroxy-2-methylethyl propionate, hydroxyethyl acetate and methyl 2-hydroxy-3-m ethylbutanoate; or ketonic acid esters such as ethyl pyruvate. It may include N-methylformamide, N,N-dimethylformamide, N-methylformanilide, N-methylacetamide, N, N-dimethylacetamide, N-methylpyrrolidone, dimethyl sulfoxide, benzylethyl ether, di-hexyl ether, acetylacetone, isophorone, caproic acid, caprylic acid, 1-octanol, 1-nonanol, benzyl alcohol, benzyl acetate, ethyl benzoate, diethyl oxalate, diethyl maleate, γ-butyrolactone, ethylene carbonate, propylene carbonate, phenyl cellosolve acetate, or a combination thereof.

According to another embodiment, the solvent may include glycol ethers such as ethylene glycol monoethyl ether; ethylene glycol alkyl ether acetates such as ethyl cellosolve acetate; esters such as 2-hydroxyethyl propionate; diethylene glycols such as diethylene glycol monomethyl ether; propylene glycol alkyl ether acetates such as propylene glycol monomethyl ether acetate and propylene glycol propyl ether acetate; or a combination thereof.

A content of the solvent may be in a range of about 50 to about 98 parts by weight per 100 parts by weight of the total photosensitive resin composition, in which case, the photosensitive resin composition can have an appropriate viscosity, so that the processability can be excellent.

The scattering particles may be light-scattering particles capable of refracting or reflecting light. The scattering particles may include inorganic particles, organic resin particles, or combinations of organic particles and inorganic particles. The scattering particles may include inorganic particles which may have different particle diameters. According to an embodiment of the disclosure, the particle diameters of the scattering particles may be in a range of about 150 to about 200 nm, in which case, the light scattering effect may be excellent to increase the light conversion efficiency in the wavelength control layer.

The scattering particles may include inorganic oxide particles, organic particles, or a combination thereof. The scattering particles may include, for example, $BiFeO_3$, $Fe_2O_3$, $WO_3$, $TiO_2$, SiC, $BaTiO_3$, ZnO, $ZrO_2$, ZrO, $Ta_2O_5$, $MoO_3$, $TeO_2$, $Nb_2O_5$, $Fe_3O_4$, $V_2O_5$, $Cu_2O$, BP, $Al_2O_3$, $In_2O_3$, $SnO_2$, ITO or any combination thereof. According to an embodiment of the disclosure, the scattering particles may include $TiO_2$.

A content of the scattering particles in the photosensitive resin composition may be in a range of about 6 to about 15 parts by weight per 100 parts by weight of the total solid content of the photosensitive resin composition, in which case, the light scattering effect may be excellent to increase the light conversion efficiency in the wavelength control layer. An optical density of the scattering particles may be in a range of about 0.1 to about 0.2/μm.

The liquid-repellent agent can improve the compatibility with the binder and can improve film thickness uniformity. In particular, according to this embodiment, the liquid-repellent agent can improve the development and reactivity of the pattern. As mentioned earlier, uncured residues may be effused to the surface of the fourth insulating layer PAS4 on which the ink may be applied due to outgassing during the post-baking process of the upper bank layer UBN (see FIG. 7). As a result, the surface of the fourth insulating layer PAS4 (see FIG. 7) may become hydrophobic. Accordingly, the spreadability of the ink applied on the fourth insulating layer may be deteriorated.

According to this embodiment, the reactivity (or sensitivity) can be increased to completely cure the photosensitive resin composition, the development can be improved to remove uncured residues, and the molecular weight can be increased to suppress the effusion of the uncured residues during outgassing. To this end, the photosensitive resin composition for preparing the upper bank layer can improve reactivity, development, and molecular weight by adding a liquid-repellent agent, which will be described later.

The liquid-repellent agent may include a compound represented by Chemical Formula 1:

[Chemical Formula 1]

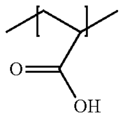

The liquid-repellent agent may further include: a compound represented by Chemical Formula 2 or Chemical Formula 3; and a compound represented by Chemical Formula 4:

[Chemical Formula 2]

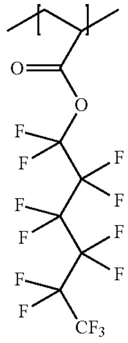

-continued

[Chemical Formula 3]

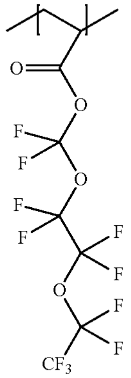

[Chemical Formula 4]

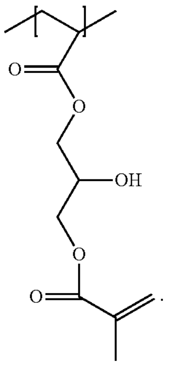

The compound represented by Chemical Formula 1 can improve the development and reactivity of the photosensitive resin composition and can increase the acid value of the liquid-repellent agent. The compounds represented by Chemical Formulas 2 and 3 may include a fluorine (F) component, and may be cross-linked with the compound represented by Chemical Formula 4 to increase the liquid repellency of the photosensitive resin composition. For example, the compound represented by Chemical Formula 2 or Chemical Formula 3 may include a polytetrafluoroethylene or perfluoropolyether unit.

The liquid-repellent agent may have a weight-average molecular weight in a range of about 30,000 to about 90,000. If outgassing occurs during the post-baking after the photosensitive resin composition has been applied on the substrate, uncured residues may be effused onto the fourth insulating layer. According to an embodiment of the disclosure, the liquid-repellent agent may have a weight-average molecular weight in a range of about 30,000 to about 90,000, and may be bonded to the binder to reduce the possibility that uncured residues may be effused in case that outgassing occurs.

An acid value of the liquid-repellent agent may be in a range of about 20 to about 60 mgKOH/g. The acid value of the liquid-repellent agent may be in a range of about 20 to about 60 mgKOH/g for solubility and UV reactivity on a developer of the photosensitive resin composition. According to an embodiment of the disclosure, the acid value of the liquid-repellent agent may be in a range of about 30 to about 60 mgKOH/g. In order to maintain the solubility for the developer of the photosensitive resin composition, the liquid-repellent agent may have a ratio of the weight-average molecular weight to the acid value in a range of about 1,000 to about 1,500. If the ratio of the weight-average molecular weight of the liquid-repellent agent to the acid value is 1,500 or less, it may be possible to prevent a decrease in the solubility for the developer. If the ratio of the weight-average molecular weight of the liquid-repellent agent to the acid value is 1,000 or more, it may be possible to prevent a decrease in the reactivity An amount of the compound represented by Chemical Formula 2 or Chemical Formula 3 in the liquid-repellent agent may be equal to or greater than about 50% of a total amount of the liquid-repellent agent. In this instance, by improving the bond between the photosensitive resin composition and the liquid-repellent agent, it is possible to give robustness to the pattern. In an embodiment, in case that an amount of the compound represented by Chemical Formula 2 or Chemical Formula 3 in the liquid-repellent agent is equal to or greater than about 50% of a total amount of the liquid-repellent agent, a surface energy of the bank made of the photosensitive resin composition may be 18 dyne/cm or less.

A content of the liquid-repellent agent may be in a range of about 0.1 to about 3 parts by weight per 100 parts by weight of the total solid content of the photosensitive resin composition. According to an embodiment of the disclosure, the content of the liquid-repellent agent may be in a range of about 0.1 to about 1 parts by weight per 100 parts by weight of the total solid content of the photosensitive resin composition. According to an embodiment of the disclosure, the content of the liquid-repellent agent may be in a range of about 0.1 to about 0.5 parts by weight per 100 parts by weight of the total solid content of the photosensitive resin composition.

The photosensitive resin composition according to an embodiment may be used for the above-described upper bank layer UBN of FIG. 7. As described above, by including the liquid-repellent agent containing the compound represented by Chemical Formula 1 in the photosensitive resin composition, it may be possible to prevent uncured residues of the upper bank layer from being effused onto the fourth insulating layer to make the surface of the fourth insulating layer hydrophobic. Accordingly, it may be possible to improve the spreadability of the ink applied onto the surface of the fourth insulating layer partitioned by the upper bank layer.

Hereinafter, Examples and Experimental Examples for the photosensitive resin composition according to the above-described embodiment will be described in detail.

<Preparation of Liquid-Repellent Agent>

Example 1

48 parts by weight of the compound represented by Chemical Formula 2 and 52 parts by weight of the compound represented by Chemical Formula 4 were used per 100 parts by weight of the total liquid-repellent agent.

Example 2

A liquid-repellent agent was prepared in the same manner as Example 1 except that 38 parts by weight of the compound represented by Chemical Formula 2, 53 parts by weight of the compound represented by Chemical Formula 4, and 9 parts by weight of the compound represented by Chemical Formula 1 were used per 100 parts by weight of the total liquid-repellent agent.

Example 3

A liquid-repellent agent was prepared in the same manner as Example 1 except that 39 parts by weight of the compound represented by Chemical Formula 2, 48 parts by weight of the compound represented by Chemical Formula 4, and 13 parts by weight of the compound represented by Chemical Formula 1 were used per 100 parts by weight of the total liquid-repellent agent.

Experimental Example 1: Measurement of Acid Value of Liquid-Repellent Agent

The acid values of the liquid-repellent agents prepared in Examples 1 to 3 were measured and shown in Table 1 below:

TABLE 1

| Liquid-Repellent Agent | Acid Value (mgKOH/g) |
|---|---|
| Example 1 | 0 |
| Example 2 | 20 |
| Example 3 | 30 |

As shown in Table 1, the liquid-repellent agent of Example 1 not containing the compound represented by Chemical Formula 1 had the acid value of zero. On the other hand, the liquid-repellent agents of Examples 2 and 3 containing the compound represented by Chemical Formula 1 had the acid values of 20 and 30 mgKOH/g, respectively. It can be seen that the acid values of the liquid-repellent agent increase if they contain the compound represented by Chemical Formula 1, and if the content is increased, the acid values may also increase.

<Preparation of Photosensitive Resin Composition>

Example 4

40 parts by weight of a photopolymerizable monomer (DPHA), 50 parts by weight of a binder (alkali-soluble resin), 2 parts by weight of a photopolymerization initiator (Irgacure 369), 10 parts by weight of scattering particles ($TiO_2$), and 1 part by weight of a liquid-repellent agent were prepared per 100 parts by weight of the solid content. A photosensitive resin composition A was prepared by mixing the solid content and the scattering particles in 60 parts by weight of the solvent per 100 parts by weight of the photosensitive resin composition. Herein, the liquid-repellent agent prepared in Example 3 was used.

Experimental Example 2: Measurement of Surface Energies of Bank and Silicon Oxide Thin Film Exposed by Opening of Bank A silicon oxide ($SiO_2$) thin film was deposited on a glass substrate, the photosensitive resin composition prepared in Example 4 described above was applied, and pre-bake, exposure, development, and post-bake processes were carried out, so that a bank pattern having an opening exposing the silicon oxide thin film was formed. In doing so, the weight-average molecular weight of the liquid-repellent agent were 6,400, 16,000 and 35,000 for Substrate Samples #1 to #3, respectively.

Figure 8:
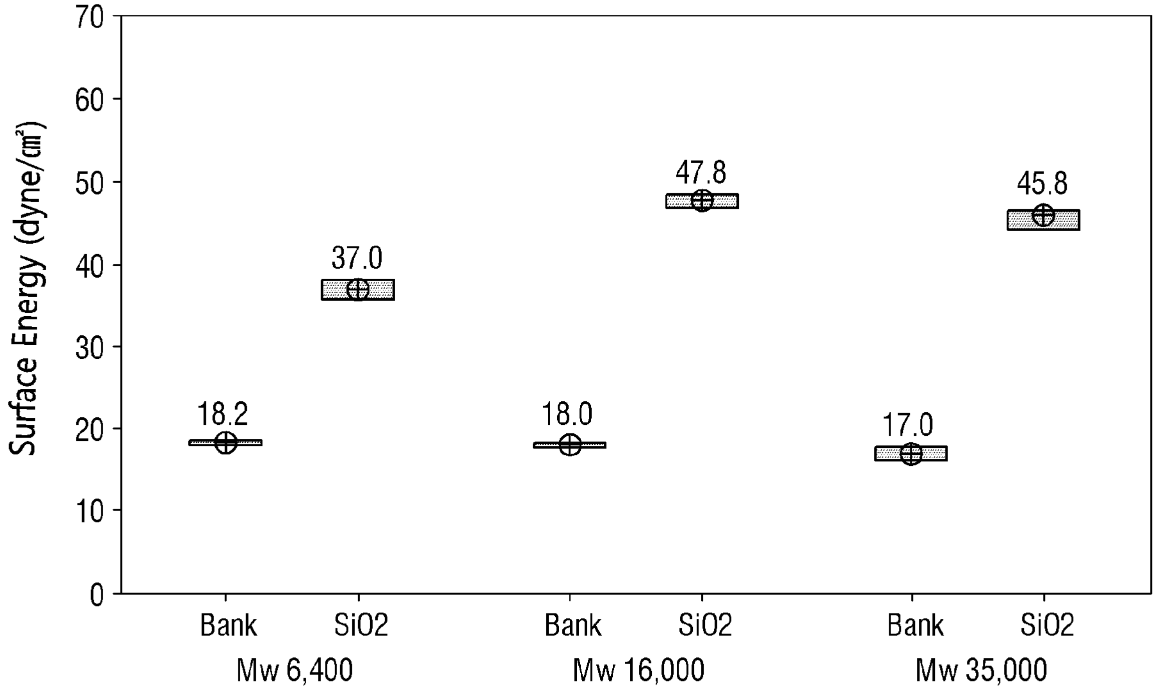
FIG. 8 is a graph showing the surface energy of the bank and the surface energy of the silicon oxide thin film exposed by the opening of the bank in each of Substrate Samples #1 to #3.

The surface energy of the bank and the surface energy of the silicon oxide thin film exposed by the opening of the bank in each of Substrate Samples #1 to #3 were measured, and shown in FIG. 8. FIG. 8 is a graph showing the surface energy of the bank and the surface energy of the silicon oxide thin film exposed by the opening of the bank in each of Substrate Samples #1 to #3.

Referring to FIG. 8, the surface energy of the bank was 18.2 dyne/cm, and the surface energy of the silicon oxide thin film was 37.0 dyne/cm in Substrate Sample #1 prepared with the photosensitive composition containing the liquid-repellent agent having the molecular weight of 6,400.

The surface energy of the bank was 18.0 dyne/cm, and the surface energy of the silicon oxide thin film was 47.8 dyne/cm in Substrate Sample #2 prepared with the photosensitive composition containing the liquid-repellent agent having the molecular weight of 16,000.

The surface energy of the bank was 17.0 dyne/cm, and the surface energy of the silicon oxide thin film was 45.8 dyne/cm in Substrate Sample #3 prepared with the photosensitive composition containing the liquid-repellent agent having the molecular weight of 35,000.

In view of the above, as the molecular weight of the liquid-repellent agent was increased, the surface energy of the silicon oxide thin film exposed by the opening of the bank was 45 dyne/cm or more. For example, considering that the surface energy of a typical silicon oxide thin film may be approximately 50 dyne/cm, it was seen that the surface of the silicon oxide thin film exposed by the opening of the bank was suppressed from being hydrophobic by the uncured residues of the bank.

Figure 9:
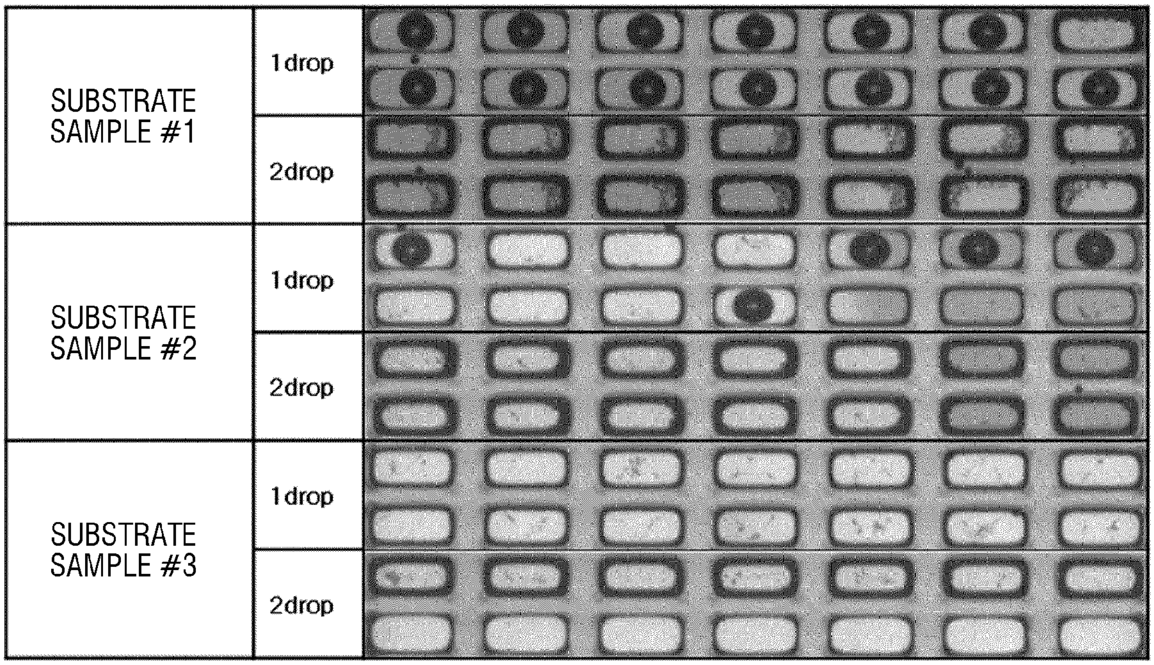
FIG. 9 is a table showing images of the inks observed with the optical camera after the inks were dropped into the openings of Substrate Samples #1 to #3.

Experimental Example 3: Evaluation of Spreadability of Ink on Silicon Oxide Thin Film Exposed by Opening of Bank According to Increase in Molecular Weight of Liquid-Repellent Agent An ink was dropped into an opening of each of Substrate Samples #1 to #3 prepared in Experimental Example 2, and the ink was observed with an optical camera and shown in FIG. 9. Herein, the ink drop amount was divided into 1 drop and 2 drops. Experiments were repeated on the same samples several times. FIG. 9 is a table showing images of the inks observed with the optical camera after the inks were dropped into the openings of Substrate Samples #1 to #3.

Referring to FIG. 9, in Substrate Sample #1 with the photosensitive composition containing the liquid-repellent agent having the molecular weight of 6,400, most of the ink droplets in the opening were observed in the case of 1 drop, while the ink droplets spread into the opening in the case of 2 drops.

In Substrate Sample #2 with the photosensitive composition containing the liquid-repellent agent having the molecular weight of 16,000, some of the ink droplets in the opening were observed in the case of 1 drop, while the ink droplets spread into the opening in the case of 2 drops.

In Substrate Sample #3 with the photosensitive composition containing the liquid-repellent agent having the molecular weight of 35,000, no ink droplet was observed in the case of 1 drop or in the case of 2 drops, but the ink droplets spread into the opening.

In view of the above, it was seen that as the molecular weight of the liquid-repellent agent increased, the spreadability of the ink dropped on the surface of the silicon oxide thin film exposed by the opening of the bank was better.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the claims.

What is claimed is:

1. A photosensitive resin composition comprising:

a binder;

a photopolymerizable monomer;

a photopolymerization initiator;

a solvent; and a liquid-repellent agent comprising a compound represented by Chemical Formula 1:

[Chemical Formula 1]

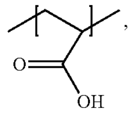

wherein the liquid-repellent agent further comprises:

a compound represented by Chemical Formula 2 or Chemical Formula 3; and a compound represented by Chemical Formula 4:

[Chemical Formula 2]

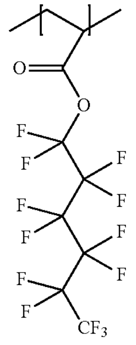

[Chemical Formula 3]

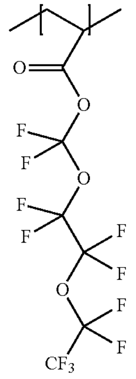

-continued

[Chemical Formula 4]

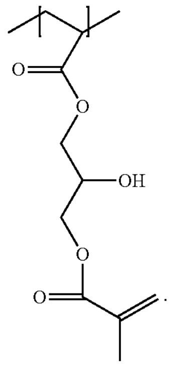

2. The composition of claim 1, wherein an acid value of the liquid-repellent agent is in a range of about 20 to 60 about mgKOH/g.

3. The composition of claim 1, wherein a weight-average molecular weight of the liquid-repellent agent is in a range of about 30,000 to about 90,000.

4. The composition of claim 1, wherein a ratio of a weight-average molecular weight of the liquid-repellent agent to an acid value of the liquid-repellent agent is in a range of about 1,000 to about 1,500.

5. The composition of claim 1, wherein an amount of the compound represented by Chemical Formula 2 or Chemical Formula 3 in the liquid-repellent agent is equal to or greater than about 50% of a total amount of the liquid-repellent agent.

6. The composition of claim 1, wherein the photopolymerizable monomer comprises ethylene glycol di(meth) acrylate, diethylene glycol di(meth)acrylate, triethylene glycol di(meth)acrylate, propylene glycol di(meth)acrylate, neopentyl glycol di(meth)acrylate, 1,4-butanediol di(meth)

acrylate, 1,6-hexanediol di(meth)acrylate, bisphenol A di(meth)acrylate, pentaerythritol di(meth)acrylate, pentaerythritol tri (meth)acrylate, pentaerythritol tetra (meth) acrylate, pentaerythritol hexa (meth)acrylate, dipentaerythritol di(meth)acrylate, dipentaerythritol tri (meth)acrylate, dipentaerythritol penta (meth)acrylate acrylate, dipentaerythritol hexa (meth)acrylate, bisphenol A epoxy (meth) acrylate, ethylene glycol monomethyl ether (meth)acrylate, trimethylol propane tri (meth)acrylate, tris (meth)acryloyloxyethyl Phosphate, novolac epoxy (meth)acrylate, or a combination thereof.

7. The composition of claim 1, wherein the photopolymerization initiator comprises an oxime-based compound, an acetophenone-based compound, a thioxanthone-based compound, a benzophenone-based compound, or a combination thereof.

8. The composition of claim 1, wherein the binder comprises an epoxy resin, an acrylic resin, or a combination thereof.

9. The composition of claim 1, wherein the solvent comprises ethylene glycol monoethyl ether, ethyl cellosolve acetate, 2-hydroxyethyl propionate, diethylene glycol monomethyl, propylene glycol monomethyl ether acetate, propylene glycol propyl ether acetate, or a combination thereof.

10. The composition of claim 1, wherein the photosensitive resin composition further comprises scattering particles, and the scattering particles have a particle diameter in a range of about 150 to about 200 nm.

11. The composition of claim 10, wherein a content of the scattering particles in the photosensitive resin composition is in a range of about 6 to about 15 parts by weight per 100 parts by weight of a total solid content of the photosensitive resin composition.

* * * * *